(12) United States Patent
Yamauchi et al.

(10) Patent No.: US 11,708,054 B2
(45) Date of Patent: Jul. 25, 2023

(54) VEHICLE CLEANING SYSTEM

(71) Applicant: DENSO CORPORATION, Kariya (JP)

(72) Inventors: Yuusuke Yamauchi, Kariya (JP);
Daisuke Shirakura, Kariya (JP);
Shigehisa Hamaguchi, Kariya (JP);
Shouta Adachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 16/771,290

(22) PCT Filed: Jun. 7, 2018

(86) PCT No.: PCT/JP2018/021938
§ 371 (c)(1),
(2) Date: Jun. 10, 2020

(87) PCT Pub. No.: WO2019/116607
PCT Pub. Date: Jun. 20, 2019

(65) Prior Publication Data
US 2020/0391702 A1 Dec. 17, 2020

(30) Foreign Application Priority Data

Dec. 12, 2017 (JP) ................................ 2017-237730

(51) Int. Cl.
*B60S 1/56* (2006.01)
*B60S 1/48* (2006.01)
*B60Q 9/00* (2006.01)

(52) U.S. Cl.
CPC ............. *B60S 1/56* (2013.01); *B60Q 9/00* (2013.01); *B60S 1/481* (2013.01)

(58) Field of Classification Search
None
See application file for complete search history.

(56) References Cited

U.S. PATENT DOCUMENTS

2013/0092758 A1 * 4/2013 Tanaka .................. B60S 1/52
239/284.1
2013/0207577 A1 * 8/2013 Natsume ................ B60S 1/08
318/286
(Continued)

FOREIGN PATENT DOCUMENTS

DE         10340499 A1 *  3/2005 .............. B60S 1/485
DE    102005060326 A1 *  6/2007 ................ B60S 1/08
(Continued)

OTHER PUBLICATIONS

Sep. 4, 2018 International Search Report issued in International Patent Application No. PCT/JP2018/021938.

*Primary Examiner* — Spencer E. Bell
*Assistant Examiner* — Omair Chaudhri
(74) *Attorney, Agent, or Firm* — Oliff PLC

(57) ABSTRACT

A cleaning target provided to a vehicle is automatically cleaned in an appropriate manner. A vehicle cleaning system includes a cleaning section configured to clean a cleaning target provided to a vehicle, and a control section configured to control cleaning of the cleaning target by the cleaning section according to at least one out of a travel situation of the vehicle, an environmental situation of the vehicle, or an indicator relating to adhesion of adhered material to the cleaning target of the vehicle.

11 Claims, 12 Drawing Sheets

(56) References Cited

U.S. PATENT DOCUMENTS

| | | | | |
|---|---|---|---|---|
| 2014/0104426 A1* | 4/2014 | Boegel | ............... | B60R 1/10 |
| | | | | 348/148 |
| 2015/0019075 A1* | 1/2015 | Melcher | ............... | B60S 1/0818 |
| | | | | 701/36 |
| 2016/0272164 A1* | 9/2016 | Hsiao | ............... | B60S 1/52 |
| 2017/0113654 A1* | 4/2017 | Crombez | ............... | B60S 1/0896 |
| 2018/0141521 A1* | 5/2018 | Irie | ............... | H04N 17/002 |
| 2018/0143298 A1* | 5/2018 | Newman | ............... | G01C 21/3484 |
| 2018/0312141 A1* | 11/2018 | Ghannam | ............... | B60R 1/00 |
| 2019/0009752 A1* | 1/2019 | Rice | ............... | B60S 1/56 |
| 2019/0077377 A1* | 3/2019 | Schmidt | ............... | B60S 1/0848 |
| 2019/0106085 A1* | 4/2019 | Bacchus | ............... | B60S 1/62 |
| 2019/0135239 A1* | 5/2019 | Rice | ............... | B60S 1/52 |
| 2019/0322245 A1* | 10/2019 | Kline | ............... | B60S 1/0848 |
| 2020/0110407 A1* | 4/2020 | Miura | ............... | B60S 1/56 |

FOREIGN PATENT DOCUMENTS

| | | | | | |
|---|---|---|---|---|---|
| DE | 102009040993 A1 | * | 3/2011 | ............... | B60S 1/485 |
| JP | 2006347297 A | * | 12/2006 | | |
| JP | 2007055562 A | * | 3/2007 | ............... | B60S 1/52 |
| JP | 5168341 B2 | * | 3/2013 | ............... | B60S 1/0848 |
| JP | 2013-100077 A | | 5/2013 | | |
| JP | 2015-137070 A | | 7/2015 | | |
| JP | 2015-224032 A | | 12/2015 | | |
| JP | 2016-9099 A | | 1/2016 | | |
| JP | 2016-78489 A | | 5/2016 | | |
| JP | 2016078489 A | * | 5/2016 | | |

\* cited by examiner

FIG.4
LIDAR SENSOR FACE
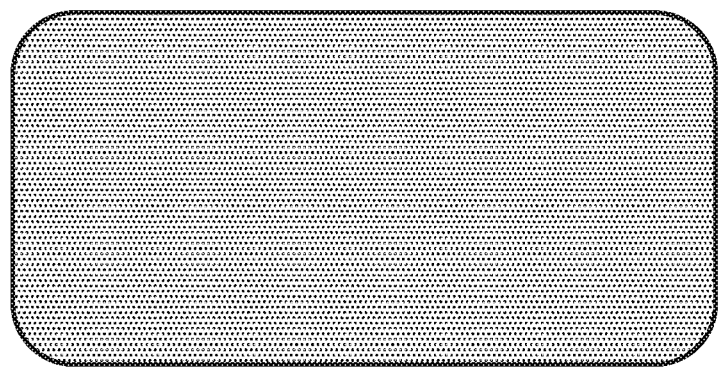
CLEANING PRIORITY LEVELS
AREA B:    AREA A:    AREA B:
LOW      HIGH      LOW
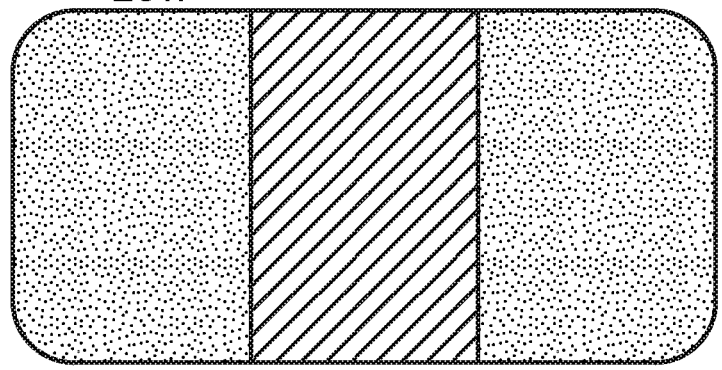
CLEANING LEVEL IN CASES IN
WHICH AREA A IS DIRTY: THOROUGH
CLEANING LEVEL IN CASES IN
WHICH AREA B IS DIRTY: MEDIUM

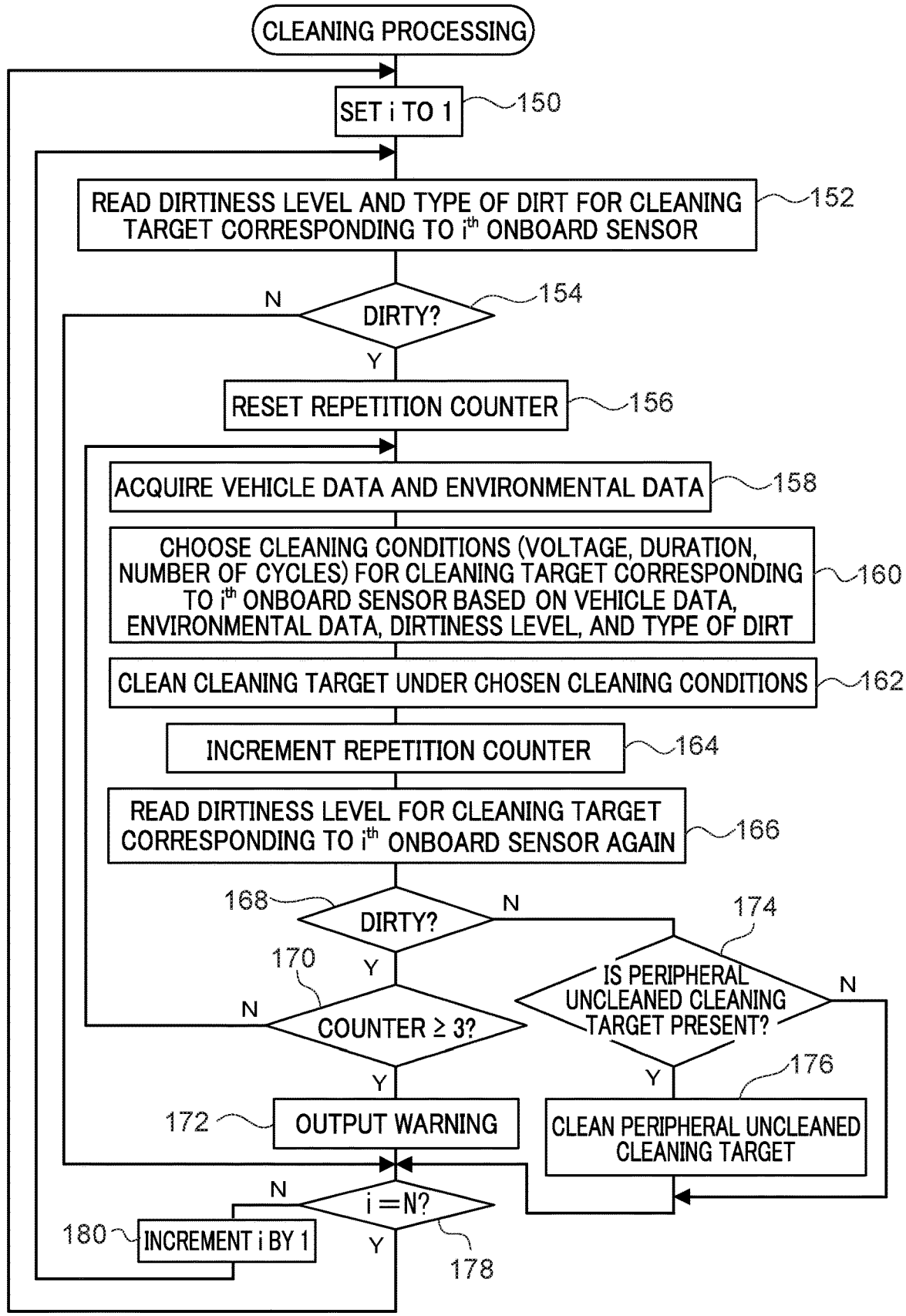

FIG.6

| INPUT PARAMETERS / CLEANING CONDITIONS | | | OPERATION VOLTAGE | OPERATION DURATION | NUMBER OF OPERATION CYCLES |
|---|---|---|---|---|---|
| SPEED (km/h) | <20 | | LOW | SHORT | - |
| | 20 TO 80 | | MEDIUM | MEDIUM | - |
| | 80< | | HIGH | MEDIUM | - |
| TEMPERATURE (°C) | <10 | | HIGH | MEDIUM | - |
| | 0 TO 10 | | MEDIUM | MEDIUM | - |
| | 10< | | LOW | SHORT | - |
| WEATHER | RAIN | | LOW | SHORT | - |
| | SNOW | | MEDIUM | MEDIUM | - |
| | FINE/CLOUDY | | LOW | SHORT | - |
| DISTANCE TRAVELED SINCE PREVIOUS CLEAN (km) | <50 | | LOW | SHORT | - |
| | 50≤ | | MEDIUM | LONG | - |
| TYPE OF DIRT | WATER DROPLETS | | LOW | SHORT | - |
| | MUDDY WATER | | LOW | SHORT | - |
| | DRIED-ON MUD | | MEDIUM | MEDIUM | - |
| DIRTINESS LEVEL (TRANSMISSIVITY) | <25 | | HIGH | LONG | 2 |
| | 25 TO 50 | | MEDIUM | MEDIUM | - |
| | 50< | | LOW | SHORT | - |
| REPETITION COUNTER VALUE | 1 | | LOW | SHORT | - |
| | 2 | DIRT REMOVAL SUCCESS RATE HIGH | LOW | SHORT | - |
| | | MEDIUM | MEDIUM | MEDIUM | - |
| | | LOW | HIGH | LONG | 2 |
| PRIORITY RANKING | | | HIGH ← MEDIUM ← LOW | LONG ← MEDIUM ← SHORT | 2 → 1 |

23b

CLEANING LEVEL IF SLIGHTLY DIRTY: MEDIUM

CLEANING LEVEL IF VERY DIRTY: THOROUGH

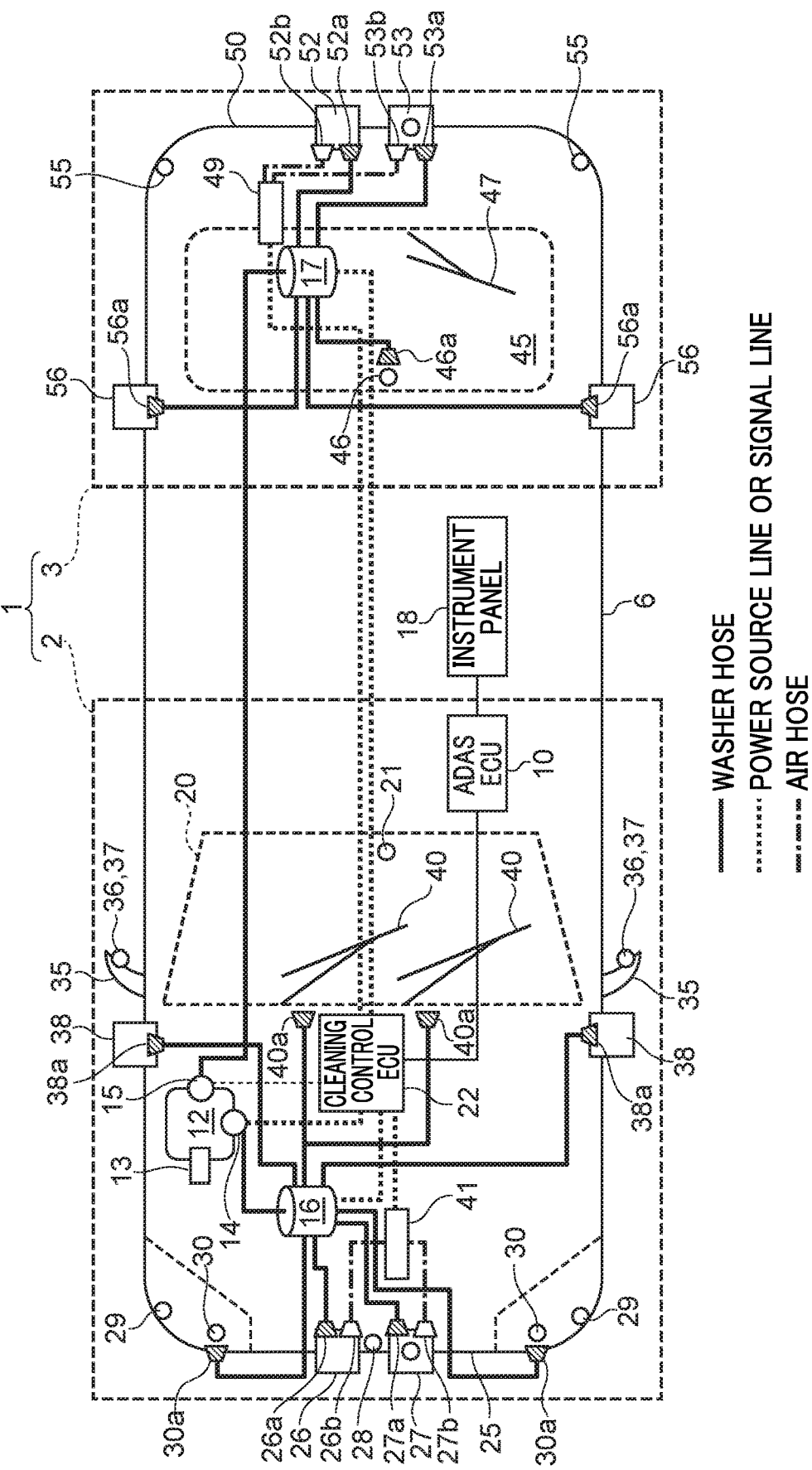

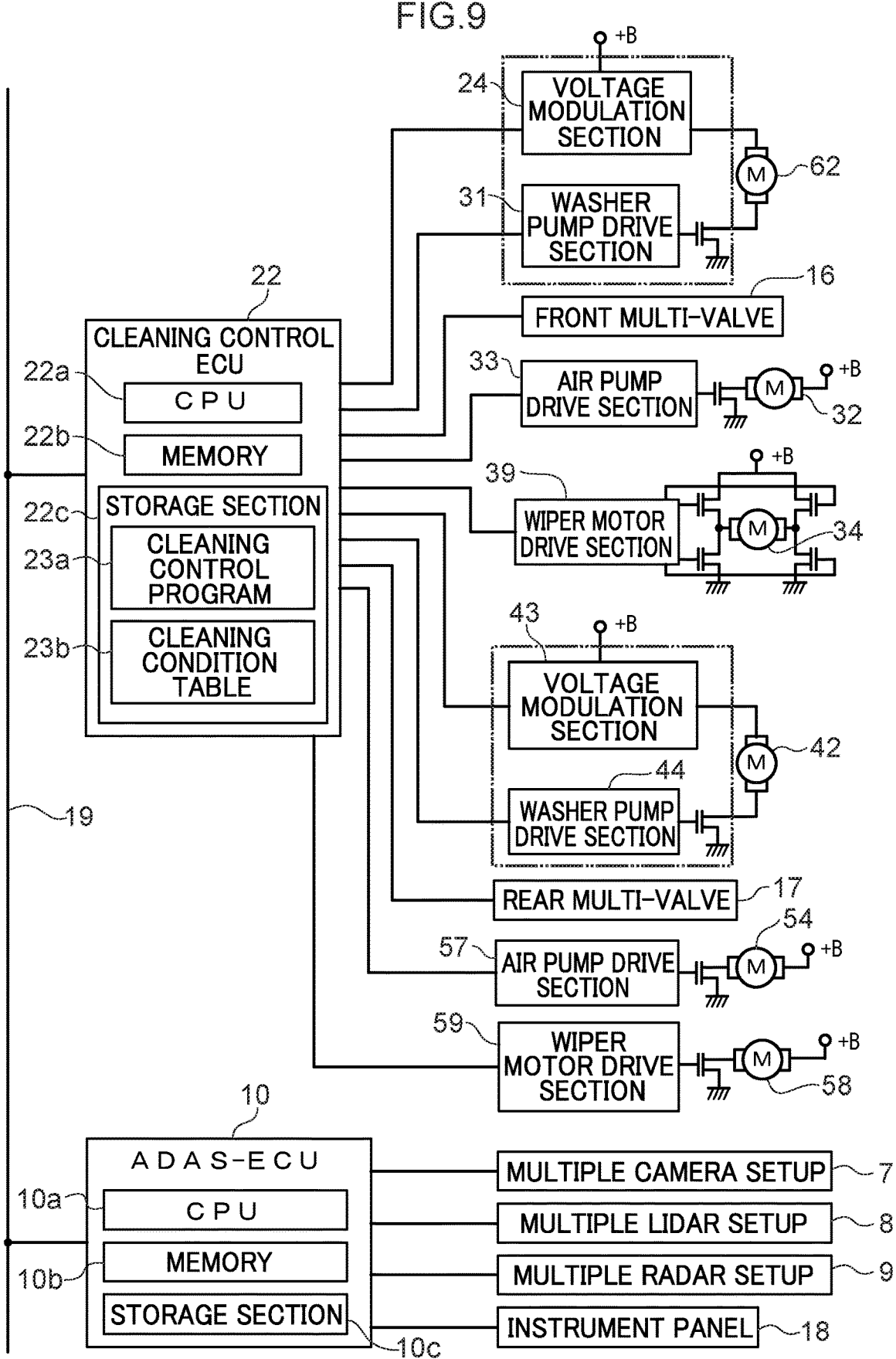

FIG.11

Table 23b

| INPUT PARAMETERS | | | CLEANING CONDITIONS | | | NUMBER OF AIR BLOWING CYCLES |
|---|---|---|---|---|---|---|
| | | | CLEANING LIQUID | | | |
| | | | OPERATION VOLTAGE | OPERATION DURATION | NUMBER OF OPERATION CYCLES | |
| SPEED (km/h) | <20 | | LOW | SHORT | 1 | 1 |
| | 20 TO 80 | | MEDIUM | MEDIUM | 1 | 1 |
| | 80< | | HIGH | MEDIUM | 1 | 2 |
| TEMPERATURE (°C) | <10 | | HIGH | MEDIUM | 1 | 2 |
| | 0 TO 10 | | MEDIUM | MEDIUM | 1 | 1 |
| | 10< | | LOW | SHORT | 1 | 1 |
| WEATHER | RAIN | | LOW | SHORT | 1 | 1 |
| | SNOW | | MEDIUM | MEDIUM | 1 | 2 |
| | FINE/CLOUDY | | LOW | SHORT | 1 | 1 |
| DISTANCE TRAVELED SINCE PREVIOUS CLEAN (km) | <50 | | LOW | SHORT | 1 | 1 |
| | 50< | | MEDIUM | LONG | 1 | 2 |
| TYPE OF DIRT | WATER DROPLETS | | LOW | SHORT | 1 | 1 |
| | MUDDY WATER | | LOW | SHORT | 1 | 2 |
| | DRIED-ON MUD | | MEDIUM | MEDIUM | 1 | 0 |
| DIRTINESS LEVEL (TRANSMISSIVITY) | <25 | | HIGH | LONG | 2 | 2 |
| | 25 TO 50 | | MEDIUM | MEDIUM | 1 | 1 |
| | 50< | | LOW | SHORT | 1 | 1 |
| REPETITION COUNTER VALUE | 1 | | LOW | SHORT | 1 | 1 |
| | 2 | DIRT REMOVAL SUCCESS RATE LOW | LOW | SHORT | 1 | 1 |
| | | DIRT REMOVAL SUCCESS RATE MEDIUM | MEDIUM | MEDIUM | 1 | 1 |
| | | DIRT REMOVAL SUCCESS RATE HIGH | HIGH | LONG | 2 | 2 |
| PRIORITY RANKING | | | HIGH → MEDIUM → LOW | LONG → MEDIUM → SHORT | 2 → 1 | 2 → 1 |

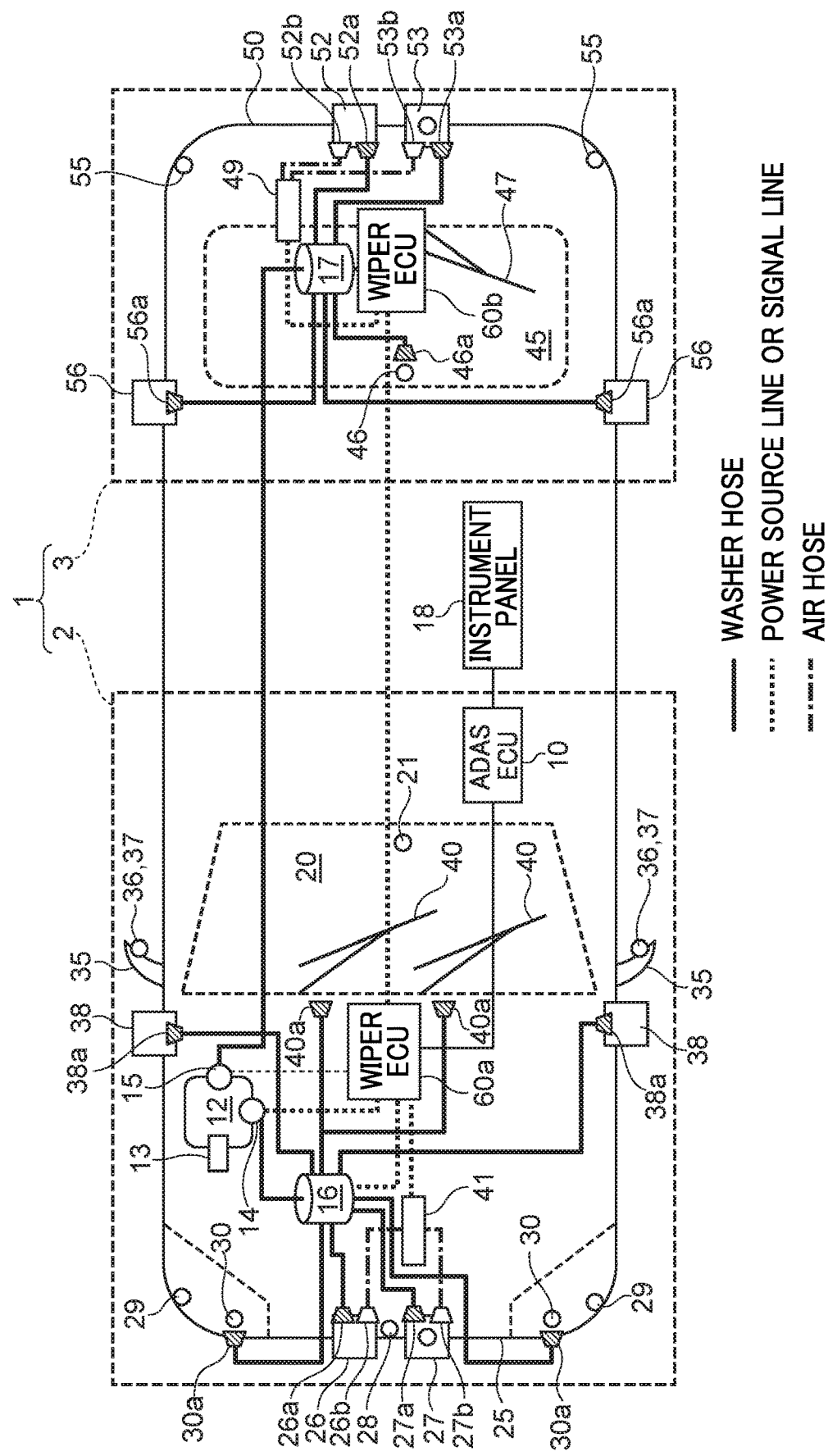

VEHICLE CLEANING SYSTEM

TECHNICAL FIELD

The present invention relates to a vehicle cleaning system.

BACKGROUND ART

Development of technology relating to driving assistance and autonomous driving in vehicles has been progressing in recent years. To install a driving assistance system in a vehicle in order to perform driving assistance or autonomous driving of the vehicle, various onboard sensors are required in order to detect travel states of the vehicle. Such onboard sensors include internally installed vehicle sensors such as satellite positioning systems (for example, GPS), acceleration sensors, gyroscopic sensors, temperature sensors, level sensors, speed sensors, revolution speed sensors, travel distance sensors, and driving operation detectors, as well as radar to detect states in the vehicle surroundings using electromagnetic waves such as millimeter wave radar, and optical sensors used to detect vehicle travel states, travel lanes, road signs, travel demarcation lines, other vehicles, obstacles external to the vehicle, and so on.

Adhered material such as dirt (for example mud) or water droplets may adhere to surfaces of onboard sensors, or covers or glass (sensor faces or sensing faces) present in front thereof. When adhered material adheres to front or rear windshields, such adhered material can be removed since cleaning devices such as washer nozzles, wipers, and the like are attached. However, in cases in which adhered material adheres to the sensor faces of onboard sensors disposed at the vehicle exterior, the detection performance of these onboard sensors may suffer. Technology for cleaning the sensor faces of onboard sensors has therefore been proposed.

Japanese Patent Application Laid-Open (JP-A) No. 2015-224032 discloses technology to remove dirt that has adhered to the surface of the lens of an onboard camera. In the technology disclosed in this related art, cleaning water is sprayed under pressure through a liquid nozzle toward the lens surface to clean dirt from the lens surface. Air is then blown under pressure through an air nozzle to dry the cleaning water remaining on the lens surface. This technology employs a common liquid pump for generating both pressurized cleaning water and pressurized air.

SUMMARY OF INVENTION

Technical Problem

Vehicles installed with driving assistance systems are installed with numerous onboard sensors. If adhered material adheres to the sensor faces of these onboard sensors, the detection capability of the onboard sensors may suffer. The technology disclosed in the above related art describes cleaning a single optical sensor by manually actuating a cleaning system. However, in cases in which the cleaning system is manually operated, it is necessary to ascertain the dirtiness level of a cleaning target, which places a burden on the user of the vehicle. In particular, it would be difficult to ascertain the dirtiness level of each individual cleaning target in cases in which there are plural cleaning targets.

In consideration of the above circumstances, an object of the present invention is to obtain a vehicle cleaning system capable of automatically cleaning a cleaning target provided to a vehicle in an appropriate manner.

Solution to Problem

A vehicle cleaning system according to a first aspect of the present invention includes a cleaning section configured to clean a cleaning target including an onboard sensor provided to a vehicle, and a control section configured to choose a cleaning condition for the cleaning section according to at least one out of a travel situation of the vehicle, an environmental situation of the vehicle, or an indicator relating to adhesion of adhered material to the cleaning target, and to cause the cleaning target to be cleaned by the cleaning section under the chosen cleaning condition.

The first aspect of the present invention includes the cleaning section configured to clean the cleaning target provided to the vehicle. Note that travel situation of the vehicle is correlated to the adhesion state of adhered material to the cleaning target, and the environmental situation of the vehicle is also correlated to the adhesion state of adhered material to the cleaning target. The indicator relating to adhesion of adhered material to the cleaning target of the vehicle is also correlated to the adhesion state of adhered material to the cleaning target. Based on these, the control section of the first aspect of the present invention chooses the cleaning condition for the cleaning section according to at least one out of the travel situation of the vehicle, the environmental situation of the vehicle, or the indicator relating to adhesion of adhered material to the cleaning target of the vehicle in order to cause the cleaning target to be cleaned by the cleaning section under the chosen cleaning condition.

This enables the cleaning target to be automatically cleaned in an appropriate manner according to the adhesion state of adhered material to the cleaning target. Moreover, excessive cleaning by the cleaning section in situations in which there is only light adhesion of adhered material to the cleaning target can be suppressed compared to cases in which in which cleaning by the cleaning section is performed under uniform cleaning conditions irrespective of the travel situation of the vehicle, the environmental situation of the vehicle, and the indicator relating to adhesion of adhered material to the cleaning target.

A second aspect of the present invention is the first aspect of the present invention, wherein the control section is configured to choose a cleaning condition of the cleaning target so as to include at least one out of an operation intensity, an operation duration, or a number of operation cycles of the cleaning section as the cleaning condition for the cleaning section, and control the at least one out of the operation intensity, the operation duration, or the number of operation cycles of the cleaning section during cleaning of the cleaning target by the cleaning section. This enables the at least one out of the operation intensity, the operation duration, or the number of operation cycles of the cleaning section to be better suppressed from becoming excessive in situations in which there is only light adhesion of adhered material to the cleaning target compared to cases in which in which cleaning by the cleaning section is performed under uniform cleaning conditions.

A third aspect of the present invention is the first aspect or the second aspect of the present invention, further including a storage section configured to store a cleaning condition for the cleaning section associated with at least one out of the travel situation of the vehicle, the environmental situation of the vehicle, or the indicator relating to adhesion of adhered material to the cleaning target. The control section is configured to choose a cleaning condition corresponding to the at least one out of the travel situation of the vehicle, the environmental situation of the vehicle, or the indicator relating to adhesion of an adhered material to the cleaning target based on data stored in the storage section. Storing the cleaning condition for the cleaning section in the storage section in this manner enables processing to choose the cleaning condition for the cleaning section to be made simpler than in cases in which the cleaning condition for the cleaning section is determined using conditional branching.

A fourth aspect of the present invention is of any one of the first aspect to the third aspect of the present invention, wherein the control section is configured to report cases in which the indicator relating to adhesion of adhered material to the cleaning target is a value indicating that an adhered material is present even though cleaning of the cleaning target by the cleaning section has been performed a predetermined number of times. This enables an occupant of the vehicle to be informed in cases in which removal of adhered material adhering to the cleaning target is considered to be difficult to achieve by cleaning using the cleaning section.

A fifth aspect of the present invention is of any one of the first aspect to the fourth aspect of the present invention, wherein plural of the cleaning sections are provided corresponding to plural cleaning targets provided to the vehicle, and the control section is configured to control each of the individual cleaning sections independently of each other. This enables each of the plural cleaning targets provided to the vehicle to be automatically cleaned in an appropriate manner according to the adhesion state of adhered material.

There is also correlation between the adhesion states of adhered material in the plural cleaning targets provided to the vehicle. Reflecting this, a sixth aspect of the present invention is the fifth aspect of the present invention, wherein the control section is configured to acquire an indicator relating to adhesion of adhered material to a first cleaning target provided to the vehicle, choose a cleaning condition by employing the indicator relating to adhesion of adhered material to the first cleaning target as an indicator relating to adhesion of adhered material to a second cleaning target provided to the vehicle, and control the cleaning section so as to clean the second cleaning target based on the chosen cleaning condition. Accordingly, even in cases in which an indicator relating to adhesion of adhered material has not been acquired for some of the cleaning targets out of the plural cleaning targets provided to the vehicle, cleaning of such cleaning targets can still be controlled using an indicator relating to adhesion of adhered material. This enables precision cleaning of the cleaning targets.

A seventh aspect of the present invention is of any one of the first aspect to the sixth aspect of the present invention, wherein the travel situation of the vehicle includes at least one out of a speed of the vehicle, a travel route of the vehicle, a distance traveled by the vehicle, or a time elapsed since a predetermined processing.

An eighth aspect of the present invention is of any one of the first aspect to the seventh aspect of the present invention, wherein the environmental situation of the vehicle includes at least one out of temperature or weather.

Moreover, a ninth aspect of the present invention is of any one of the first aspect to the eighth aspect of the present invention, wherein the indicator relating to adhesion of adhered material to a cleaning target of the vehicle includes at least one out of an adhesion level of adhered material to the cleaning target, an adhered material type, or an adhesion location of the adhered material.

A tenth aspect of the present invention is of any one of the first aspect to the ninth aspect of the present invention, wherein the cleaning section is configured to clean by spraying liquid or blowing air onto a cleaning target.

An eleventh aspect of the present invention is of any one of the first aspect to the tenth aspect of the present invention, wherein a driving assistance device or an autonomous driving device is installed in the vehicle, and the cleaning target provided to the vehicle includes a sensor employed by the driving assistance device or the autonomous driving device. This enables a drop in functionality of the driving assistance device or the autonomous driving device to be suppressed in response to the adhesion state of adhered material to the cleaning target of the vehicle.

BRIEF DESCRIPTION OF DRAWINGS

FIG. 4 is a plan view illustrating an example of a predetermined area set on a sensor face of a LIDAR.

FIG. 5 is a flowchart illustrating an example of cleaning processing according to the first exemplary embodiment.

FIG. 6 is a table illustrating an example of a cleaning condition table according to the first exemplary embodiment.

FIG. 8 is a plan view schematically illustrating a vehicle installed with a vehicle cleaning system according to a second exemplary embodiment.

FIG. 9 is a block diagram illustrating an outline configuration of a control system of a vehicle cleaning system according to the second exemplary embodiment.

FIG. 11 is a table illustrating an example of a cleaning condition table according to the second exemplary embodiment.

FIG. 12 is a plan view schematically illustrating a vehicle installed with a vehicle cleaning system according to another configuration.

DESCRIPTION OF EMBODIMENTS

Detailed explanation follows regarding examples of exemplary embodiments of the present invention, with reference to the drawings.

First Exemplary Embodiment

Figure 1:
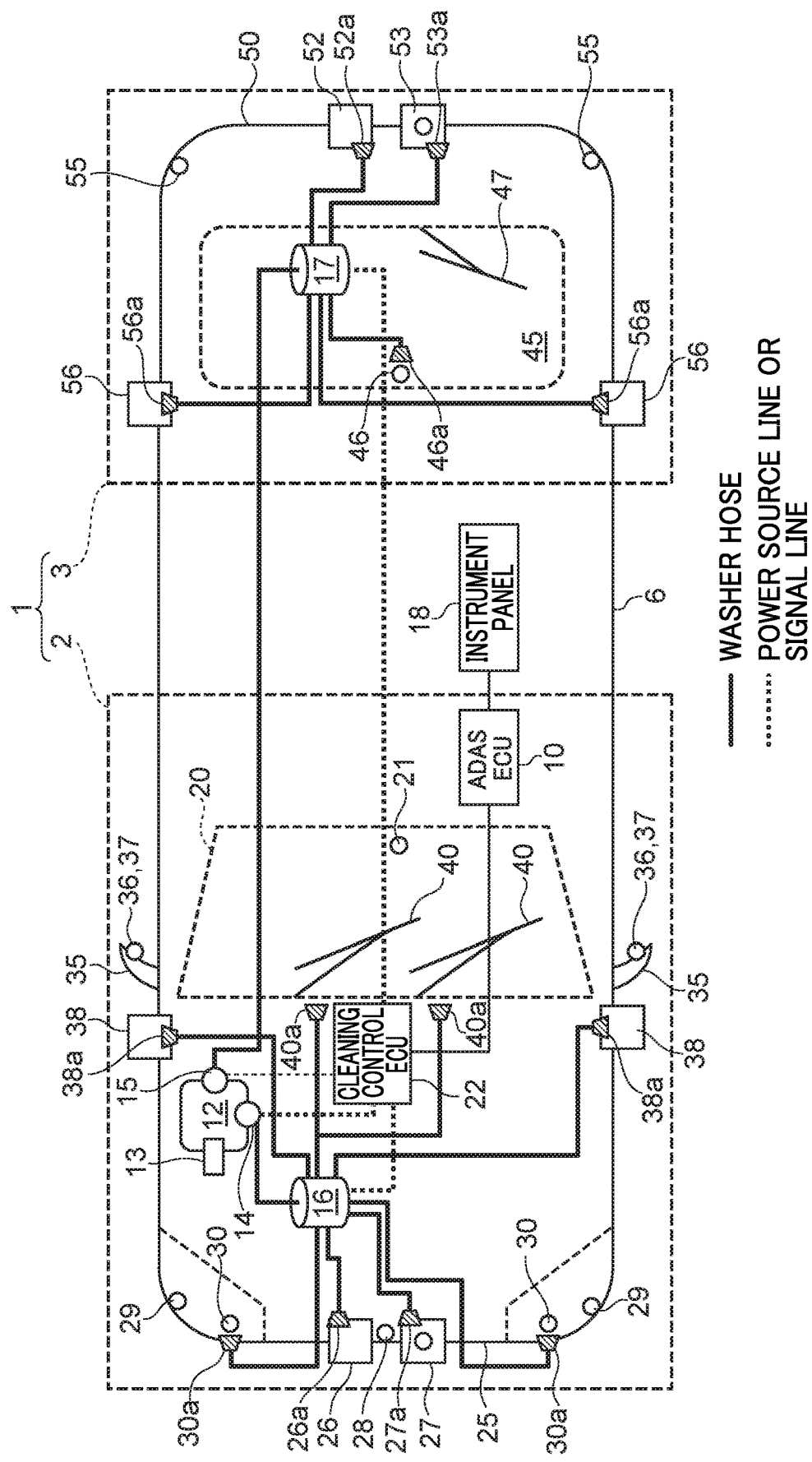
FIG. 1 is a plan view schematically illustrating a vehicle installed with a vehicle cleaning system according to a first exemplary embodiment.

As illustrated in FIG. 1, a vehicle 6 is installed with an Advanced Driver Assistance System Electronic Control Unit (ADAS-ECU) 10, and also installed with a vehicle cleaning system 1 that performs cleaning of predetermined locations of the vehicle 6.

Autonomous driving including vehicle driving assistance is classified into the following levels, as defined in SAE J3016 of SAE international (a U.S. non-profit organization for mobility experts).

Level 0: No driving automation
Level 1: Driving assistance
Level 2: Partial driving automation
Level 3: Conditional autonomous driving
Level 4: High level autonomous driving
Level 5: Full autonomous driving Level 0 vehicles are vehicles requiring the driver to perform all driving operations, and correspond to general vehicles not provided with a driving automation system. Level 1 vehicles are vehicles in which a driving automation system performs either steering wheel operation or acceleration and deceleration control of the vehicle, while other operation is performed by the driver. In level 1 vehicles, the driver controls the vehicle as appropriate in response to situations in the surroundings, and operation of autonomous driving system requires monitoring. Level 1 vehicles correspond to vehicles with adaptive cruise control functionality (devices to perform travel at a constant speed or control inter-vehicle distance). Level 2 vehicles are vehicles in which a driving automation system performs both steering wheel operation and acceleration and deceleration control of the vehicle, while other operation is performed by the driver. In level 2 vehicles, the driver controls the vehicle in response to situations in the surroundings, and operation of autonomous driving system operation requires monitoring.

Level 3 to level 5 vehicles are classified as vehicles provided with what is referred to as an autonomous driving system. Level 3 vehicles are vehicles in which a driving automation system performs all driving operation in accordance with situations in the surroundings, but requires driver intervention in emergencies. Level 4 vehicles are vehicles in which a driving automation system performs all driving operation in accordance with situations in the surroundings, and driver intervention is not expected. Although dependent on the surrounding environment, level 4 vehicles are fundamentally capable of unmanned driving. Level 5 vehicles are vehicles in which a driving automation system performs all driving operation in accordance with situations in the surroundings unconditionally, and are capable of fully unmanned driving.

Figure 2:
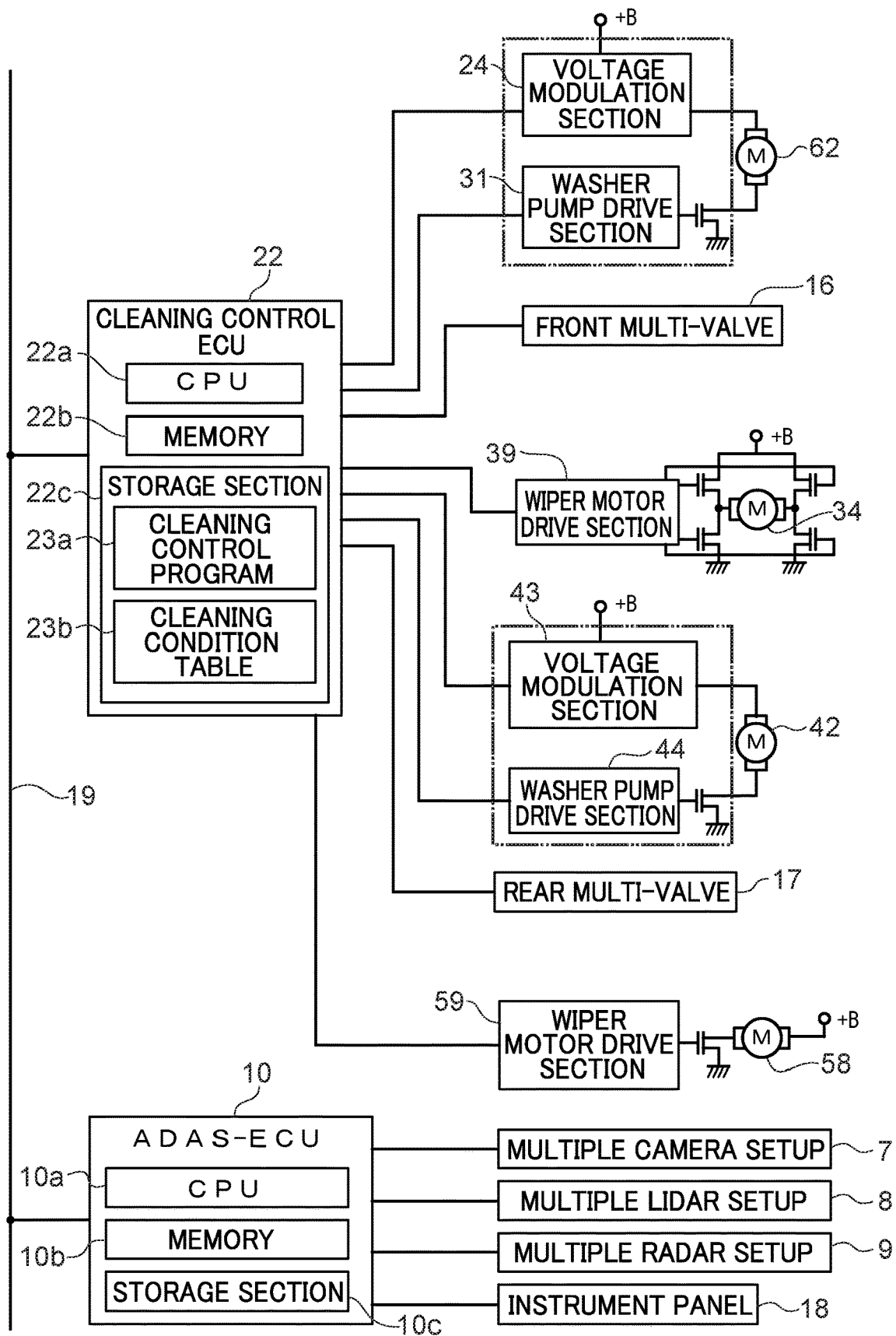
FIG. 2 is a block diagram illustrating an outline configuration of a control system of a vehicle cleaning system according to the first exemplary embodiment.

As illustrated in FIG. 2, the ADAS-ECU 10 includes a CPU 10a, memory 10b, and a non-volatile storage section 10c. A program to perform autonomous driving processing is stored in the storage section 10c. This program is read from the storage section 10c, expanded in the memory 10b, and executed by the CPU 10a. The ADAS-ECU 10 is connected to a multiple camera setup 7, a multiple Light Detection and Ranging or Laser Imaging Detection and Ranging (LIDAR) setup 8, a multiple radar setup 9 (all of which are described in detail later), and an instrument panel 18, all of which are installed in the vehicle 6. The ADAS-ECU 10 acquires detection data from the respective cameras of the multiple camera setup 7, the respective LIDARs of the multiple LIDAR setup 8, and the respective radars of the multiple radar setup 9, recognizes the situation in the surroundings of the vehicle 6 based on the acquired detection data, and performs autonomous driving processing corresponding to one level out of level 3 to level 5. Note that the ADAS-ECU 10 is an example of an autonomous driving device.

Note that the ADAS-ECU 10 ascertains data such as a travel situation of the vehicle 6 and an environmental situation of the vehicle 6. The travel situation of the vehicle 6 includes data such as the speed, distance traveled (cumulative distance traveled), travel route (road classifications such as general road or expressway, or paved road or non-paved road, and congestion data), travel direction of the vehicle 6, and status of the vehicle 6 (data such as the status of an ignition switch and vehicle type). The environmental situation includes data such as the weather, temperature, and road surface condition.

As illustrated in FIG. 1, a front camera 21 is disposed at an upper inside portion of a front windshield (front side windshield) 20 of the vehicle 6. The front camera 21 is installed at a back side of a rear view mirror at the top of the front windshield 20 inside a vehicle cabin, so as to face ahead of the vehicle 6 to perform forward capture through the glass of the front windshield 20. Note that there is no limitation to the front camera 21 being installed at the back side of the rear view mirror. For example, the front camera 21 may be directly attached to the top of the front windshield 20 inside the vehicle cabin. The front camera 21 is an example of an onboard sensor.

The front camera 21 is included in the multiple camera setup 7 illustrated in FIG. 2, and images captured by the front camera 21 are output to the ADAS-ECU 10. The ADAS-ECU 10 performs image analysis processing on the images captured by the respective cameras of the multiple camera setup 7 in order to detect objects present in the surroundings of the vehicle 6. For example, object detection based on images captured by the front camera 21 enables objects to be identified, thereby enabling other vehicles, pedestrians, and the like to be detected and distinguished from other objects, and also enabling recognition of road signs and lane markings on the road surface.

Although a single front camera 21 is provided in the present exemplary embodiment, two or more front cameras 21 may be provided according to their role. Although a monocular camera may be employed as the front camera 21, what is referred to as a stereo camera including plural (for example two) cameras may be employed. In such cases, the stereo camera can be employed to estimate the distance to objects based on the parallax of plural captured images.

When the front windshield 20 located in front of the front camera 21 becomes dirty with mud or the like, a shadow appears in the images captured by the front camera 21. Moreover, when water droplets adhere to the front windshield 20 during wet weather, this can render images unclear and hinder image analysis. There is accordingly a requirement to clean the front windshield 20 located in front of the front camera 21.

In the present exemplary embodiment, the vehicle cleaning system 1 includes a front cleaning system 2 and a rear cleaning system 3. The front cleaning system 2 includes wipers 40 and washer nozzles 40a provided at a lower front portion of the front windshield 20 in order to clean the front windshield 20 disposed in front of the front camera 21. The wipers 40 and the washer nozzles 40a are examples of cleaning sections. Cleaning liquid is sprayed through the washer nozzles 40a, and the wipers 40 wipe adhered material from the front windshield 20, including from in front of the front camera 21.

A LIDAR 26, a front grille camera 27, and a long-range millimeter wave radar 28 are provided at a central portion in front of a front grille 25. Medium range millimeter wave radars 29 and a pair of headlights 30 are provided at both ends in front of the front grille 25. The LIDAR 26 is included in the multiple LIDAR setup 8 illustrated in FIG. 2, the front grille camera 27 is included in the multiple camera setup 7 illustrated in FIG. 2, and the millimeter wave radars 28, 29 are included in the multiple radar setup 9 illustrated in FIG. 2. The LIDAR 26 and the front grille camera 27 are examples of onboard sensors.

The LIDAR 26 is a sensor that, for example, emits infrared laser light pulses and measures distances based on the time taken for the laser light pulses to be reflected back by objects. The LIDAR 26 is also capable of detecting the relative directions of objects by scanning while changing the direction of a narrowed infrared laser light using movable mirrors. The LIDAR 26 employs infrared laser light, thereby enabling detection of objects with low reflectivity to electromagnetic waves, and in particular is capable of detecting objects with the potential to obstruct travel, such as cardboard boxes, pieces of wood, or expanded polystyrene scattered on the road. The LIDAR 26 is also capable of not only object detection, but also detection of empty spaces between objects, due to its ability to detect the distances and relative directions of objects with high spatial resolution.

Since the LIDAR 26 is, for example, a sensor employing infrared light, the detection performance thereof may suffer if dirt adheres to the sensor face. There is accordingly a requirement to clean the sensor face of the LIDAR 26. The front cleaning system 2 includes a washer nozzle 26a provided in the vicinity of the sensor face of the LIDAR 26 to spray cleaning liquid toward the sensor face in order to clean the sensor face of the LIDAR 26. The washer nozzle 26a is an example of a cleaning section.

The millimeter wave radars 28, 29 serve as electromagnetic wave sensors, and emit electromagnetic waves of very short wavelength, known as millimeter waves, and are capable of detecting the distances and directions of objects by detecting these electromagnetic waves being reflected back by the objects. The millimeter wave radars 28, 29 perform detection using self-generated electromagnetic waves, enabling good detection characteristics unaffected by light sources or weather to be maintained and thus enabling accurate measurement of the distances of objects. In particular, the long-range millimeter wave radar 28 is capable of accurately detecting another vehicle present ahead even when traveling through heavy rain, thick fog, or snow. Since the millimeter wave radars 28, 29 employ electromagnetic waves, even if adhered material such as dirt or water droplets were to adhere to detection faces thereof, this would not impede detection as long as the electromagnetic waves were able to pass through. There is accordingly less of a necessity to provide cleaning sections to these detection faces. However, cleaning sections such as washer nozzles may be provided thereto if required.

Object detection based on images captured by the front grille camera 27 enables objects to be identified, thereby enabling other vehicles, pedestrians, and the like to be detected and distinguished from other objects, and also enabling recognition of road signs and lane markings on the road surface. The front grille camera 27 may also be employed to provide an around view. When a sensor face of the front grille camera 27 becomes dirty with mud or the like, this causes a shadow to appear in images. Water droplet adherence is also conceivable during wet weather. This can result in unclear images and hinder image analysis. There is accordingly a requirement to clean the sensor face of the front grille camera 27. Thus, the front cleaning system 2 includes a washer nozzle 27a that sprays cleaning liquid toward the sensor face of the front grille camera 27 in order to clean the sensor face of the front grille camera 27. The washer nozzle 27a is also an example of a cleaning section.

The headlights 30 are provided on both left and right sides in front of the front grille 25, and shine ahead of the vehicle 6 at night and in wet weather. The headlights 30 are provided in the vicinity of both ends of the front grille 25. Since the light level may become insufficient if the headlights 30 become dirty due to mud or the like being flicked up when traveling on rough roads or in wet weather, there is a requirement to provide cleaning sections thereto. Thus, the front cleaning system 2 includes washer nozzles 30a provided in the vicinity of each of the headlights 30 to spray cleaning liquid toward illumination faces of the headlights 30 in order to clean the illuminated faces of the headlights 30. The washer nozzles 30a are also examples of cleaning sections. Note that cleaning sections such as washer nozzles may also be provided to lights such as side marker lights or indicator lights in addition to the headlights 30.

Door mirror cameras 36 are provided to door mirrors 35 of the vehicle 6 in order to image toward the rear. Images captured by the door mirror cameras 36 are displayed as captured images on a display section provided to the instrument panel 18. Downward-facing door mirror cameras 37 are also provided on the undersides of the door mirrors to enable detection of other vehicles, pedestrians, and so on present in the surroundings. Although cleaning sections are not provided to the door mirror cameras 36 and the downward-facing door mirror cameras 37 in the present exemplary embodiment, cleaning sections such as air nozzles may be provided if required. If necessary, cleaning sections such as air nozzles may also be provided to reflective faces of exterior mirrors such as door mirrors and fender mirrors. For example, air nozzles may be employed to blow air in order to drive off water droplets from the reflective faces of these mirrors in cases in which visibility in the mirrors deteriorates due to water droplets or the like. Note that air nozzles will be explained in a second exemplary embodiment.

Side LIDARs 38 are provided at the sides of the vehicle 6 in order to enable detection of other vehicles, pedestrians, and so on to the sides. The side LIDARs 38 are included in the multiple LIDAR setup 8 illustrated in FIG. 2. Since the LIDARs are sensors that employ infrared light, for example, the detection performance thereof may suffer if dirt adheres to the sensor faces. There is accordingly a requirement to clean the sensor faces of the side LIDARs 38. The front cleaning system 2 includes washer nozzles 38a provided in the vicinity of the sensor faces of the side LIDARs 38 to spray cleaning liquid toward the sensor faces in order to clean the sensor faces of the side LIDARs 38. The washer nozzles 38a are examples of cleaning sections, and the side LIDARs 38 are examples of onboard sensors.

A rear camera 46 is provided at the inner side of an upper central portion of a rear windshield (rear side windshield) 45. The rear camera 46 is what is referred to as an interior mirror camera, and for example video from the rear camera 46 may be played at a rear view mirror position in place of a rear view mirror. Moreover, an autonomous driving system is able to employ the rear camera 46 as an image sensor by performing image analysis on the video from the rear camera 46. The rear camera 46 may be provided with functionality of a camera employed to provide an around view. The rear camera 46 is included in the multiple camera setup 7 illustrated in FIG. 2, and is an example of an onboard sensor.

The rear cleaning system 3 includes a washer nozzle 46a provided at the upper center of the rear windshield 45 and a rear wiper 47 provided at the lower center of the rear windshield 45 in order to clean the rear windshield 45 disposed on the imaging face side of the rear camera 46. Cleaning liquid is sprayed through the washer nozzle 46a, and the rear wiper 47 is capable of wiping dirt from the rear windshield 45, including at the imaging face side of the rear camera 46. The washer nozzle 46a and the rear wiper 47 are examples of cleaning sections. Note that the rear camera 46 may alternatively be provided at a central portion of a rear bumper 50. In such cases, a cleaning section such as a washer nozzle that sprays cleaning liquid toward the sensor face and an air nozzle that blows air toward the sensor face may be provided in order to clean the sensor face of the rear camera 46.

A LIDAR 52 is provided at the center of the rear bumper 50 of the vehicle 6. The LIDAR 52 is included in the multiple LIDAR setup 8 illustrated in FIG. 2, and is an example of an onboard sensor. Since the LIDAR 52 is, for example, a sensor employing light such as infrared light, the detection performance thereof may suffer if adhered material such as dirt adheres to the sensor face. Thus, the rear cleaning system 3 includes a washer nozzle 52a provided in the vicinity of the sensor face of the LIDAR 52 to spray cleaning liquid toward the sensor face in order to clean the sensor face of the LIDAR 52. The washer nozzle 52a is an example of a cleaning section.

The vehicle 6 is provided with side LIDARs 56 at the sides and toward the rear in order to detect other vehicles, pedestrians, and so on to the sides toward the rear. The side LIDARs 56 are included in the multiple LIDAR setup 8 illustrated in FIG. 2, and are examples of onboard sensors. The rear cleaning system 3 includes washer nozzles 56a provided in the vicinity of the sensor faces of the side LIDARs 56 to spray cleaning liquid toward the sensor faces in order to clean the sensor faces of the side LIDARs 56. The washer nozzles 56a are also examples of cleaning sections.

The vehicle 6 is also provided with a rear camera 53 the center of the rear bumper 50. The rear camera 53 is employed to capture rearward images from the vehicle 6 when reversing to be displayed on a display section of the instrument panel 18. The rear camera 53 is included in the multiple camera setup 7 illustrated in FIG. 2, and is employed in an autonomous driving system as an image sensor by performing image analysis on the video from the rear camera 46. The rear cleaning system 3 includes a washer nozzle 53a provided in the vicinity of the rear camera 53 to spray cleaning liquid toward a sensor face in order to clean the sensor face of the rear camera 53. The washer nozzle 53a is an example of a cleaning section.

Medium range millimeter radars 55 are provided in the vicinity of both ends of the rear bumper 50, or toward the rear of a rear fender. The medium range millimeter radars 55 are mainly employed to detect vehicles from the rear to the sides, or to measure the inter-vehicle distance. The millimeter radars 55 are included in the multiple radar setup 9 illustrated in FIG. 2. Since millimeter wave radar employs electromagnetic waves, even if dirt were to adhere to detection faces thereof, this would not impede detection as long as the electromagnetic waves are able to pass through. There is accordingly less of a necessity to provide cleaning sections to these detection faces. Cleaning sections are therefore not provided to the medium range millimeter radars 55 in the present exemplary embodiment. However, cleaning sections such as washer nozzles may be provided if required.

Cleaning sections such as washer nozzles and air nozzles may also be provided to brake lights, rear indicator lights, and rear side marker lights if required. For example, air nozzles may be employed to blow air in order to drive off rainwater and mud in cases in which the brake lights become dirty with mud flicked up in wet weather.

Next, explanation follows regarding a cleaning liquid supply system. A washer tank 12 serving as a reservoir is provided inside an engine compartment of the vehicle 6, and a level sensor 13 is provided to the washer tank 12 in order to detect the amount of cleaning liquid remaining in the washer tank 12. A front washer pump 14 to supply cleaning liquid from the washer tank 12 to a front multi-valve 16 is provided in the washer tank 12 or in the vicinity of the washer tank 12. A hose serving as a conduit provides a connection between the front washer pump 14 and the front multi-valve 16.

A rear washer pump 15 to supply cleaning liquid from the washer tank 12 to a rear multi-valve 17 is provided in the washer tank 12 or in the vicinity of the washer tank 12. A hose serving as a conduit provides a connection between the rear washer pump 15 and the rear multi-valve 17.

Cleaning liquid is supplied from the washer tank 12 to the front multi-valve 16 by the front washer pump 14 via the hose. Plural valves capable of being individually open/close controlled are provided on the output side of the front multi-valve 16. The washer nozzle 26a for the LIDAR 26 provided at the central portion in the front of the front grille 25, the washer nozzle 27a for the front grille camera 27 provided at the central portion in front of the front grille 25, the washer nozzles 30a for the headlights 30 respectively provided on the left and right sides, the washer nozzles 38a to clean the sensor faces of the side LIDARs 38, and the washer nozzles 40a provided at the lower front of the front windshield 20 are connected to the output sides of these respective valves via respective hoses serving as individual conduits. The cleaning liquid is supplied to the front multi-valve 16 in a pressurized state, such that when control is performed to open the corresponding valve of the front multi-valve 16, the cleaning liquid is sprayed toward the cleaning target through the corresponding washer nozzle 26a, 27a, 30a, 38a, or 40a.

The cleaning liquid is supplied from the washer tank 12 to the rear multi-valve 17 by the rear washer pump 15 via the hose. Plural valves capable of being individually open/close controlled are provided on the output side of the rear multi-valve 17. The washer nozzle 46a provided at the upper center of the rear windshield 45, the washer nozzle 52a to clean the sensor face of the LIDAR 52, the washer nozzle 53a to clean the sensor face of the rear camera 53, and the washer nozzles 56a to clean the sensor faces of the side LIDARs 56 are connected to the output sides of these respective valves via respective hoses serving as individual conduits. The cleaning liquid is supplied to the rear multi-valve 17 in a pressurized state, such that when control is performed to open the corresponding valve of the rear multi-valve 17, the cleaning liquid is sprayed toward the cleaning target through the corresponding washer nozzle 46a, 52a, 53a, or 56a.

Note that there is no limitation to providing a single washer tank 12, and for example washer tanks 12 may be have a distributed placement corresponding to the placement of the front cleaning system 2 and the rear cleaning system 3. Specifically, one washer tank may be provided in the vicinity of the front cleaning system 2, and one washer tank may be provided in the vicinity of the rear cleaning system 3. This enables hoses providing front-to-rear connections in the vehicle 6 to be omitted, and also enables overall washer tank capacity to be increased. In cases in which plural washer tanks are provided, the washer tanks may be connected together by a hose, such that cleaning liquid can be supplied from one washer tank to another washer tank when the volume in either one of the washer tanks has fallen.

Explanation follows regarding a control system. The vehicle cleaning system 1 includes a cleaning control ECU 22, and the cleaning control ECU 22 includes a CPU 22A, memory 22b, and a non-volatile storage section 22c. A cleaning control program 23a and a cleaning condition table 23b are stored in the storage section 22c. The cleaning control program 23a is read from the storage section 22c, expanded in the memory 22b, and executed by the CPU 22a. The cleaning control ECU 22 thereby performs dirt detection processing and cleaning processing, described later. The cleaning control ECU 22 is connected to the ADAS-ECU 10 through a bus 19. The cleaning control ECU 22 is an example of a control section, and the storage section 22c is an example of a storage section.

The cleaning control ECU 22 is connected via a voltage modulation section 24 and a washer pump drive section 31 to a motor 62 that drives the front washer pump 14. The voltage modulation section 24 supplies the motor 62 with an operation voltage of a size instructed by the cleaning control ECU 22. An operation duration and number of operation cycles of the motor 62 are instructed by the cleaning control ECU 22, and the washer pump drive section 31 switches the motor 62 on and off according to the instructed operation duration and number of operation cycles. The front multi-valve 16 is also connected to the cleaning control ECU 22. The cleaning control ECU 22 controls the opening and closing of the plural valves of the front multi-valve 16 individually.

The cleaning control ECU 22 is also connected via a wiper motor drive section 39 to a wiper motor 34 that generates drive force to cause the wipers 40 to wipe to-and-fro. A drive direction and drive speed of the wiper motor 34 are instructed by the cleaning control ECU 22, and the wiper motor drive section 39 controls driving of the wiper motor 34 according to the instructed drive direction and drive speed.

The cleaning control ECU 22 is also connected via a voltage modulation section 43 and a washer pump drive section 44 to a motor 42 that drives the rear washer pump 15. The voltage modulation section 43 supplies the motor 42 with an operation voltage of a size instructed by the cleaning control ECU 22. An operation duration and number of operation cycles of the motor 42 are instructed by the cleaning control ECU 22, and the washer pump drive section 44 switches the motor 42 on and off according to the instructed operation duration and number of operation cycles. The cleaning control ECU 22 is also connected to the rear multi-valve 17. The cleaning control ECU 22 controls the opening and closing of the plural valves of the rear multi-valve 17 individually.

The cleaning control ECU 22 is also connected to a wiper motor 58 via a wiper motor drive section 59. A non-illustrated link mechanism that converts one-way rotation of an output shaft of the wiper motor 58 to to-and-fro swinging that is transmitted to the wiper 47 is interposed between the wiper motor 58 and the wiper 47. When the cleaning control ECU 22 has instructed driving of the wiper motor 58, the wiper motor drive section 59 drives the wiper motor 58 according to this instruction, and the wiper 47 wipes to-and-fro accordingly. The level sensor 13 (not illustrated in FIG. 2) is also connected to the cleaning control ECU 22, and a detection signal from the level sensor 13 is input to the cleaning control ECU 22.

Figure 3:
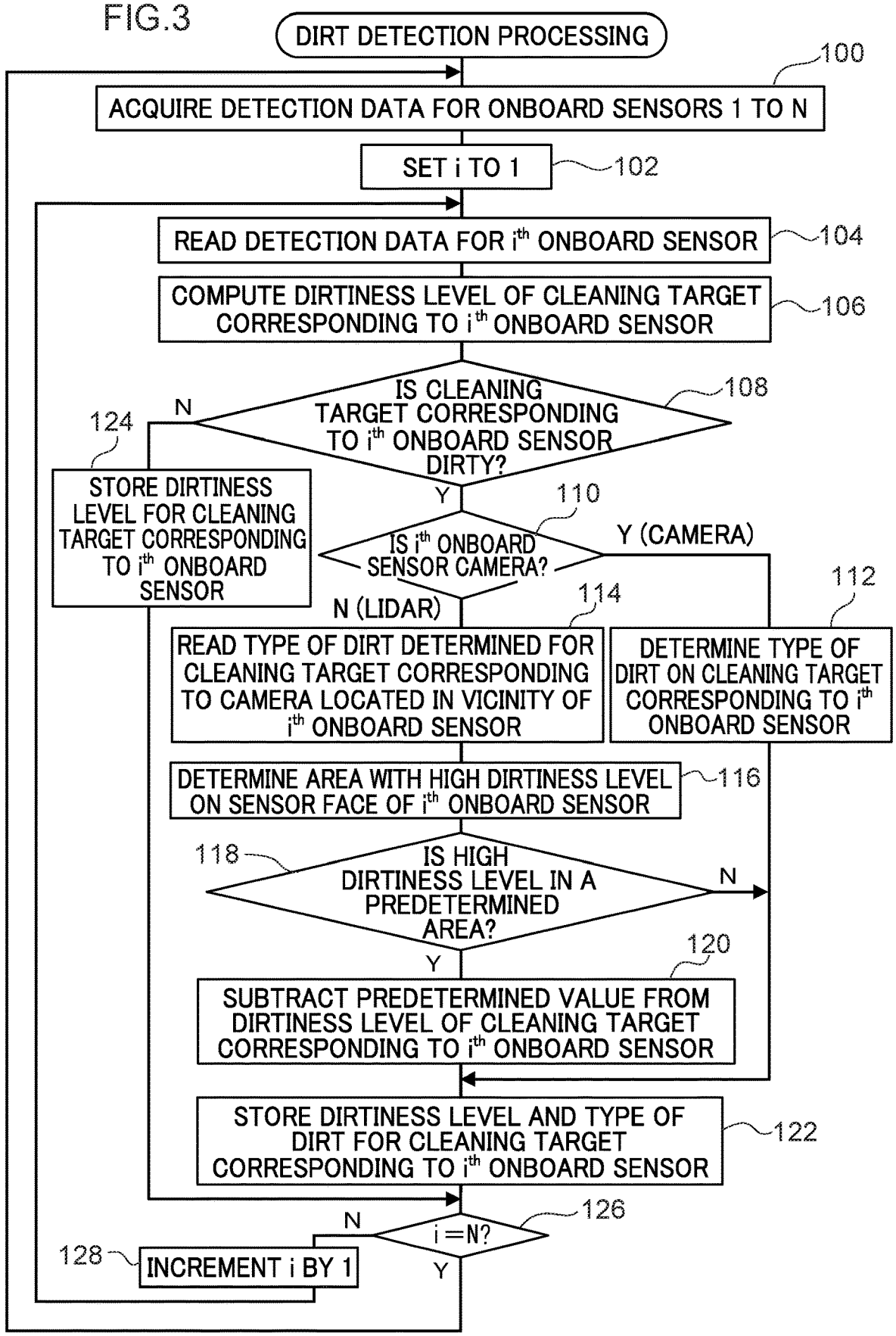
FIG. 3 is a flowchart illustrating an example of dirt detection processing.

Next, as operation of the first exemplary embodiment, explanation follows regarding the dirt detection processing performed by the cleaning control ECU 22 while the ignition switch of the vehicle 6 is on, with reference to FIG. 3. In the following explanation, the respective cameras of the multiple camera setup 7 and the respective LIDARs of the multiple LIDAR setup 8 that are provided at locations of the vehicle 6 serving as cleaning targets of the vehicle cleaning system 1 are collectively referred to as onboard sensors, and the total number of onboard sensors is denoted N.

At step 100 of the dirt detection processing, the cleaning control ECU 22 acquires from the ADAS-ECU 10 detection data that the ADAS-ECU 10 has acquired from each of the N onboard sensors and stored in the storage section 10c or the like, and stores the acquired detection data in the storage section 22c. Of this data from the onboard sensors, detection data from the cameras is for example image data captured by the cameras, and detection data from the LIDARs is for example data including the amount of received light and a light reception timing (the distance to objects) for each of plural light receiving sensors distributed on the sensor faces of the LIDARs.

At step 102, the cleaning control ECU 22 sets a variable i used to identify the individual onboard sensors to 1. At step 104, the cleaning control ECU 22 reads the detection data for the $i^{th}$ onboard sensor from the storage section 22c. At step 106, the cleaning control ECU 22 computes an evaluation value whereby a dirtiness level of the cleaning target corresponding to the $i^{th}$ onboard sensor is evaluated based on the detection data read at step 104. In the present exemplary embodiment, "the cleaning target corresponding to the $i^{th}$ onboard sensor" is the sensor face of the $i^{th}$ onboard sensor in most cases. However, there is no limitation thereto, and for example when the $i^{th}$ onboard sensor is the front camera 21, the cleaning target is the front windshield 20.

As an example of the dirtiness level evaluation value of the cleaning target, an evaluation value in which the overall dirtiness level (transmissivity) of the cleaning target is evaluated may be applied. For example, in cases in which the $i^{th}$ onboard sensor is a camera, the average brightness or minimum brightness of the entire image, this being the detection data, may be standardized to a value within a numerical range from 0 to 100 and this may be applied as the dirtiness level evaluation value of the cleaning target. Alternatively, for example, in cases in which the $i^{th}$ onboard sensor is a LIDAR, an average value or a minimum value of the amount of light received by each of the plural light receiving sensors included in the detection data may be standardized to a value within a numerical range from 0 to 100 and this may be applied as an dirtiness level evaluation value of the cleaning target. When computing the evaluation value, there is no limitation to employing detection data acquired at a single timing. Detection data previously acquired from the ADAS-ECU 10 may be accumulated in the storage section 22c, and detection data acquired on a current occasion may be compared with detection data acquired at one or plural timings in the past to compute a dirtiness level evaluation value of the cleaning target based on change in the detection data over time. The dirtiness level evaluation value of a cleaning target is an example of an indicator relating to adhesion of adhered material to the cleaning target, and is more specifically an example of an adhesion level of adhered material to the cleaning target.

At step 108, the cleaning control ECU 22 compares the dirtiness level evaluation value for the cleaning target corresponding to the $i^{th}$ onboard sensor against a predetermined value in order to determine whether or not the cleaning target corresponding to the $i^{th}$ onboard sensor is dirty. Note that the predetermined value may differ depending on the type of onboard sensor (such as camera or LIDAR). The determination of step 108 is negative and processing transitions to step 124 in cases in which the dirtiness level evaluation value of the cleaning target corresponding to the $i^{th}$ onboard sensor is the predetermined value or greater (the dirtiness level is low). At step 124, the cleaning control ECU 22 stores the dirtiness level evaluation value for the cleaning target corresponding to the $i^{th}$ onboard sensor in the storage section 22c. Processing transitions to step 126 once the processing of step 124 has been performed.

The determination of step 108 is affirmative and processing transitions to step 110 in cases in which the dirtiness level evaluation value of the cleaning target corresponding to the $i^{th}$ onboard sensor is less than the predetermined value (the dirtiness level is high). At step 110, the cleaning control ECU 22 determines whether or not the $i^{th}$ onboard sensor is a camera. Processing transitions to step 112 in cases in which the determination of step 110 is affirmative. At step 112, the cleaning control ECU 22 determines the type of dirt on the cleaning target corresponding to the $i^{th}$ onboard sensor based on the detection data from the $i^{th}$ onboard sensor, namely, based on an image captured by the camera.

As an example, the types of dirt on the cleaning target can be broadly classified into three types, these being "water droplets", "muddy water", and "Dried-on mud". In cases in which water droplets have adhered to the cleaning target, diffuse reflection occurs at the portion where the water droplets are present, resulting in numerous changes in brightness in the images captured by the corresponding camera. Thus, as an example, an evaluation value can be calculated by adding up changes in brightness between adjacent pixels in an image over the entire image, and determining that water droplets have adhered to the cleaning target in cases in which the computed evaluation value is a predetermined value or greater. However, determination as to whether or not water droplets have adhered to a cleaning target is not limited thereto.

In cases in which muddy water has adhered to the cleaning target, localized reductions arise in the brightness of an image captured by the corresponding camera. Thus, as an example, the image may be divided into plural regions and the average brightness of each region computed, and determination made that muddy water has adhered to the cleaning target in cases in which the variation between the average brightness of each region is a predetermined value or greater. However, determination as to whether or not muddy water has adhered to a cleaning target is not limited thereto.

In cases in which Dried-on mud has adhered to the cleaning target, the sharpness of an image captured by the corresponding camera is reduced. Thus, as an example, the sharpness of the image may be computed, and determination made that Dried-on mud has adhered to the cleaning target in cases in which the computed sharpness of the image is a predetermined value or lower. However, determination as to whether or not Dried-on mud has adhered to a cleaning target is not limited thereto. The types of dirt on the cleaning target are an example of an indicator relating to adhesion of adhered section to the cleaning target, and are more specifically an example of types of adhered material.

Processing transitions to step 122 when the type of dirt on the cleaning target corresponding to the $i^{th}$ onboard sensor has been determined at step 112. At step 122, the cleaning control ECU 22 stores the dirtiness level evaluation value and the type of dirt for the cleaning target corresponding to the $i^{th}$ onboard sensor in the storage section 22c. In this manner, the type of dirt is stored in addition to the dirtiness level evaluation value for a cleaning target that is determined to be dirty. Processing transitions to step 126 once the processing of step 122 has been performed.

The determination of step 110 is negative and processing transitions to step 114 in cases in which the $i^{th}$ onboard sensor is determined to be a LIDAR at step 110. At step 114, the cleaning control ECU 22 reads the type of dirt determined for a cleaning target corresponding to a camera located in the vicinity of the $i^{th}$ onboard sensor (LIDAR) as the type of dirt on the cleaning target corresponding to the $i^{th}$ onboard sensor (LIDAR).

For example, in cases in which the $i^{th}$ onboard sensor is the LIDAR 26, the type of dirt determined for the cleaning target corresponding to the front grille camera 27 located in the vicinity of the LIDAR 26 is read as the type of dirt on the cleaning target corresponding to the LIDAR 26. In this example, the cleaning target corresponding to the front grille camera 27 is an example of a first cleaning target, and the cleaning target corresponding to the LIDAR 26 is an example of a second cleaning target.

Next, at step 116, the cleaning control ECU 22 determines an area with a high dirtiness level on the cleaning target corresponding to the $i^{th}$ onboard sensor (LIDAR), based on the detection data from the $i^{th}$ onboard sensor (LIDAR). When dirt has adhered to the sensor face of the LIDAR, the amount of light received by a light receiving sensor corresponding to the location where the dirt has adhered is reduced in accordance with the amount of dirt. Thus, by comparing the amount of light received by the individual light receiving sensors included in the LIDAR, an area of the sensor face of the LIDAR where light receiving sensors with a small light reception amount are distributed, namely, an area with a high dirtiness level, can be determined.

At step 118, the cleaning control ECU 22 determines whether or not the area with a high dirtiness level determined at step 116 is a pre-set predetermined area. Note that the position of an area with a high dirtiness level is also an example of an indicator relating to adhesion of adhered material on the cleaning target, and is more specifically an example of an adhesion location of the adhered material. The distribution of light receiving sensors on the sensor face of a LIDAR is of varying density, and an example of a predetermined area is an area where there is a comparatively dense distribution of light receiving sensors on the sensor face of the LIDAR. An example of a predetermined area distribution range is indicated by "Area A" in FIG. 4. In cases in which the area with a high dirtiness level is not a predetermined area, the dirt that has adhered to the sensor face of the LIDAR may be judged to have a comparatively small effect on the detection precision of the LIDAR. Thus, processing transitions to step 122 in cases in which negative determination is made at step 118, and the dirtiness level evaluation value and the type of dirt are stored in the storage section 22c.

In cases in which the area with a high dirtiness level is a predetermined area, it can be assumed that the dirt that has adhered to the sensor face of the LIDAR has a comparatively large effect on the detection precision of the LIDAR. Thus, processing transitions to step 120 in cases in which affirmative determination is made at step 118. At step 120, the cleaning control ECU 22 subtracts a predetermined value from the dirtiness level evaluation value for the cleaning target corresponding to the $i^{th}$ onboard sensor (LIDAR). A cleaning level of the cleaning target corresponding to the $i^{th}$ onboard sensor (LIDAR) during the cleaning processing is thus increased, as described later. Processing transitions to step 122 once step 120 has been performed, and the dirtiness level evaluation value and the type of dirt are stored in the storage section 22c.

At the next step 126, the cleaning control ECU 22 determines whether or not the variable i has reached the total number of onboard sensors N. Processing transitions to step 128 in cases in which negative determination is made at step 126. At step 128, the cleaning control ECU 22 increments the variable i by 1, after which processing returns to step 104. Steps 104 to 128 are thereby performed for all of the onboard sensors. Processing returns to step 100 in cases in which affirmative determination is made at step 126, and the processing of step 100 onward is repeated. Thus, whilst the ignition switch of the vehicle 6 remains on, the dirtiness level of the corresponding cleaning target is monitored and the dirtiness level evaluation value is updated as appropriate for each of the N onboard sensors, and the type of dirt is also determined in cases in which the dirtiness level evaluation value is less than the predetermined value (i.e. the dirtiness level is high).

Next, explanation follows regarding the cleaning processing performed by the cleaning control ECU 22 while the ignition switch of the vehicle 6 remains on, with reference to FIG. 5. At step 150 of the cleaning processing, the cleaning control ECU 22 sets the variable i to 1. At step 152, the cleaning control ECU 22 reads the dirtiness level evaluation value and the type of dirt for the cleaning target corresponding to the $i^{th}$ onboard sensor from the storage section 22c. At step 154, the cleaning control ECU 22 compares the dirtiness level evaluation value for the cleaning target corresponding to the $i^{th}$ onboard sensor read at step 152 against a predetermined value in order to determine whether or not the cleaning target corresponding to the $i^{th}$ onboard sensor is dirty. Note that this predetermined value may differ depending on the type of onboard sensor (camera or LIDAR), and may also differ between autonomous driving and driver-based driving.

Negative determination is made is made at step 154 and processing transitions to step 178 in cases in which the dirtiness level evaluation value for the cleaning target corresponding to the $i^{th}$ onboard sensor is the predetermined value or greater (the dirtiness level is low). At step 178, the cleaning control ECU 22 determines whether or not the variable i has reached the total number of onboard sensors N. Processing transitions to step 180 in cases in which negative determination is made at step 178. At step 180, the cleaning control ECU 22 increments the variable i by 1, after which processing returns to step 152. Processing returns to step 150 in cases in which affirmative determination is made at step 178. Thus, no cleaning target is cleaned until an onboard sensor corresponding to a cleaning target with a dirtiness level evaluation value of less than the predetermined value appears.

Affirmative determination is made at step 154 and processing transitions to step 156 in cases in which the dirtiness level evaluation value for the cleaning target corresponding to the $i^{th}$ onboard sensor is less than the predetermined value (the dirtiness level is high). At step 156, the cleaning control ECU 22 resets a repetition counter indicating the number of cleaning repetitions to 1. At the next step 158, the cleaning control ECU 22 acquires vehicle data and environmental data from the ADAS-ECU 10. Note that although the speed and distance traveled (cumulative distance traveled) of the vehicle 6 are acquired as an example of vehicle data, and the temperature and weather in the surroundings of the vehicle 6 are acquired as an example of environmental data, there is no limitation thereto. Note that the vehicle data is an example of a travel situation of the vehicle, and the environmental data is an example of an environmental situation of the vehicle.

Next, at step 160, the cleaning control ECU 22 chooses cleaning conditions (various cleaning parameters for operation voltage of washer pump motor, operation duration, and number of operation cycles) for the cleaning target corresponding to the $i^{th}$ onboard sensor, based on the vehicle data and the environmental data acquired at step 158, and the dirtiness level and the type of dirt acquired at step 152. As an example, the cleaning condition table 23b illustrated in FIG. 6 may be employed when choosing the cleaning conditions. The cleaning condition table 23b stipulates respective cleaning conditions according to given values of the various input parameter values for the vehicle data, environmental data, dirtiness level, type of dirt, and the repetition counter value. First, the cleaning conditions corresponding to the respective input parameter values (respective cleaning parameters) are read from the cleaning condition table 23b. The respective cleaning parameter values are then chosen according to the priority ranking for each cleaning parameter as stipulated in the cleaning condition table 23b. This enables the cleaning conditions to be chosen for the cleaning target corresponding to the $i^{th}$ onboard sensor.

Further explanation follows regarding a specific example of this. As an example, the respective input parameter values are as follows.

(1) Speed of vehicle 6: 80 km/h or greater
(2) Temperature: 10° C. or greater
(3) Weather: Wet
(4) Distance traveled by vehicle 6 since previous clean: Less than 50 km
(5) Type of dirt: Water droplets
(6) Dirtiness level evaluation value: 50 or greater In this example, operation voltage: high, operation duration: medium, and number of operation cycles: 1 are read as cleaning conditions corresponding to input value (1). Operation voltage: low, operation duration: short, and number of operation cycles: 1 are read as cleaning conditions corresponding to input values (2) to (6). When collated, the read values for operation voltage are {high, low}, and so operation voltage: high is selected based on the priority ranking. When collated, the read values for the operation duration are {medium, short}, and so operation duration: medium is selected based on the priority ranking. The read values for the number of operation cycles are 1 in each case, and so the number of operation cycles is set to 1.

Note that in the cleaning condition table 23b illustrated in FIG. 6, the cleaning conditions are set such that the lower the dirtiness level evaluation value (the higher the dirtiness level), the greater the cleaning level. Moreover, in cases in which the type of dirt is Dried-on mud, this dirt is harder than other types (water droplets or muddy water) to remove. Thus, the cleaning conditions are set in the cleaning condition table 23b so as to increase the cleaning level in cases in which the type of dirt is Dried-on mud compared to other cases. Moreover, cleaning efficiency is reduced due to wind pressure as the speed of the vehicle 6 increases. Thus, the cleaning conditions are set in the cleaning condition table 23b so as to increase the cleaning level as the speed of the vehicle 6 increases. Moreover, cleaning efficiency is reduced as the temperature drops. Thus, the cleaning conditions are set in the cleaning condition table 23b so as to increase the cleaning level as the temperature drops. Moreover, adhered material is harder to remove in snowy weather than in other weather conditions (such as wet or fine/cloudy). Thus, the cleaning conditions are set in the cleaning condition table 23b so as to increase the cleaning level in snowy weather compared to other weather conditions. Moreover, the dirtiness level tends to increase as the distance traveled since the previous clean increases. Thus, the cleaning conditions are set in the cleaning condition table 23b so as to increase the cleaning level as the distance traveled since the previous clean increases.

At step 162, the cleaning control ECU 22 causes the cleaning target corresponding to the $i^{th}$ onboard sensor to be cleaned under the cleaning conditions chosen at step 160. As an example, in cases in which the front windshield 20 corresponding to the front camera 21 serving as the $i^{th}$ onboard sensor is to be cleaned, the cleaning control ECU 22 outputs an instruction to the voltage modulation section 24 such that an operation voltage of a magnitude corresponding to the operation voltage included in the cleaning conditions is supplied to the motor 62, and outputs to the washer pump drive section 31 such the motor 62 is driven on and off according to the operation duration and number of operation cycles values included in the cleaning conditions. The cleaning control ECU 22 also controls opening and closing of the valves of the front multi-valve 16 such that cleaning liquid is supplied to the washer nozzles 40a, and outputs a drive instruction for the wiper motor 34 to the wiper motor drive section 39 so as to cause the wipers 40 to wipe to-and-fro. Thus, cleaning liquid is sprayed through the washer nozzles 40a and the wipers 40 wipe to-and-fro according to the cleaning conditions chosen at step 160, such that the front windshield 20 including in front of the front camera 21 is cleaned.

Note that in cases in which cleaning liquid is sprayed plural times through a washer nozzle, precursory cleaning to moisten may be performed on a first occasion and main cleaning may be performed on a second occasion. Alternatively, main cleaning may be performed on a first occasion and finishing cleaning may be performed on a second occasion, or precursory cleaning to moisten may be performed on a first occasion, main cleaning may be performed on a second occasion, and finishing cleaning may be performed on a third occasion. Furthermore, precursory cleaning and finishing cleaning may be set with a lower operation voltage or a shorter operation duration, and main cleaning may be set with a higher operation voltage or a longer operation duration.

When cleaning is performed at step 162, the time when cleaning was performed and the cumulative distance traveled by the vehicle 6 are stored in the storage section 22c together with the variable i. This stored data is employed in ascertaining the time elapsed and distance traveled by the vehicle 6 since the previous clean. At step 164, the cleaning control ECU 22 increments the repetition counter by 1.

At step 166, the cleaning control ECU 22 again reads the dirtiness level and the type of dirt for the cleaning target corresponding to the $i^{th}$ onboard sensor from the storage section 22c. In the dirt detection processing previously described, the dirtiness level of the cleaning target is monitored and the dirtiness level evaluation value is updated as appropriate, and if the dirtiness level has been reduced as a result of the cleaning at step 162, the dirtiness level of the cleaning target read again at step 166 will be less than the dirtiness level of the cleaning target read previously at step 152.

Next, at step 168, the cleaning control ECU 22 compares the dirtiness level evaluation value for the cleaning target corresponding to the $i^{th}$ onboard sensor read again at step 166 against the predetermined value in order to determine whether or not the cleaning target corresponding to the $i^{th}$ onboard sensor is dirty. Affirmative determination is made at step 168 and processing transitions to step 170 in cases in which the dirtiness level evaluation value for the cleaning target corresponding to the $i^{th}$ onboard sensor is less than the predetermined value (the dirtiness level is high).

At step 170, the cleaning control ECU 22 determines whether or not the repetition counter value is 3 or greater. Processing returns to step 158 in cases in which negative determination is made at step 170, and the processing of step 158 onward, namely cleaning of the cleaning target corresponding to the $i^{th}$ onboard sensor, is repeated. In cases in which the repetition counter value is 2, the cleaning condition table 23b illustrated in FIG. 6 also stipulates cleaning conditions for given values of a dirt removal success rate, with the cleaning conditions being set such that the cleaning level is greater the lower the dirt removal success rate (the lower the degree of dirt removal on the first clean).

Negative determination is made at step 168 and processing transitions to step 174 in cases in which the dirtiness level evaluation value for the cleaning target corresponding to the $i^{th}$ onboard sensor has become the predetermined value or greater (the dirtiness level has decreased) prior to the repetition counter value reaching 3. At step 174, the cleaning control ECU 22 determines whether or not an uncleaned cleaning target peripheral to the cleaning target corresponding to the $i^{th}$ onboard sensor is present.

In the present exemplary embodiment, cleaning targets that are not provided with an onboard sensor are present amongst the cleaning targets of the vehicle cleaning system 1. The dirtiness level of such a cleaning target is assumed to be substantially the same as the dirtiness level of a nearby cleaning location where an onboard sensor is provided, and this cleaning target is also cleaned together, as a peripheral cleaning location, when the nearby cleaning location is cleaned. The headlights 30 are an example of cleaning targets not provided with an onboard sensor, and the LIDAR 26 or the front grille camera 27 is an example of an onboard sensor present near the headlights 30.

Negative determination is made at step 174 and processing transitions to step 178 in cases in which a peripheral uncleaned cleaning target is not present near the cleaning target corresponding to the $i^{th}$ onboard sensor. Affirmative determination is made at step 174 and processing transitions to step 176 in cases in which a peripheral uncleaned cleaning target is present near the cleaning target corresponding to the $i^{th}$ onboard sensor. At step 176, the cleaning control ECU 22 cleans the peripheral uncleaned cleaning target near the cleaning target corresponding to the $i^{th}$ onboard sensor.

For example, in cases in which the $i^{th}$ onboard sensor is the LIDAR 26 or the front grille camera 27, cleaning liquid is sprayed through the washer nozzles 30a such that the headlights 30 serving as peripheral uncleaned cleaning targets are cleaned. Note that at night or under similar conditions, the illumination range and intensity (brightness) of the headlights 30 may be determined based on an image captured by the front camera 21 in order to determine when dirt has adhered to the headlights 30.

Affirmative determination is made at step 170 and processing transitions to step 172 in cases in which the dirtiness level evaluation value for the cleaning target corresponding to the $i^{th}$ onboard sensor has still not reached the predetermined value or greater (a low dirtiness level) even though the repetition counter value has reached 3. At step 172, the cleaning control ECU 22 outputs warning data including data specifying the cleaning target corresponding to the $i^{th}$ onboard sensor to the ADAS-ECU 10, and processing transitions to step 178. In such cases, the ADAS-ECU 10 displays a warning on the instrument panel 18 or the like prompting the occupant of the vehicle 6 to clean the cleaning target corresponding to the $i^{th}$ onboard sensor. Alternatively, in cases in which the ADAS-ECU 10 is performing autonomous driving processing, the ADAS-ECU 10 may for example perform processing to stop the vehicle 6 at a safe location. Furthermore, cleaning control of the cleaning target corresponding to the $i^{th}$ onboard sensor may be prohibited until the warning display is lifted.

Note that in cases in which the type of dirt is water droplets, or in cases in which recurrent adhesion of adhered material such as water droplets on a cleaning target is envisaged, for example in wet weather, the output of warning data at step 172 may be omitted.

Figure 7A:
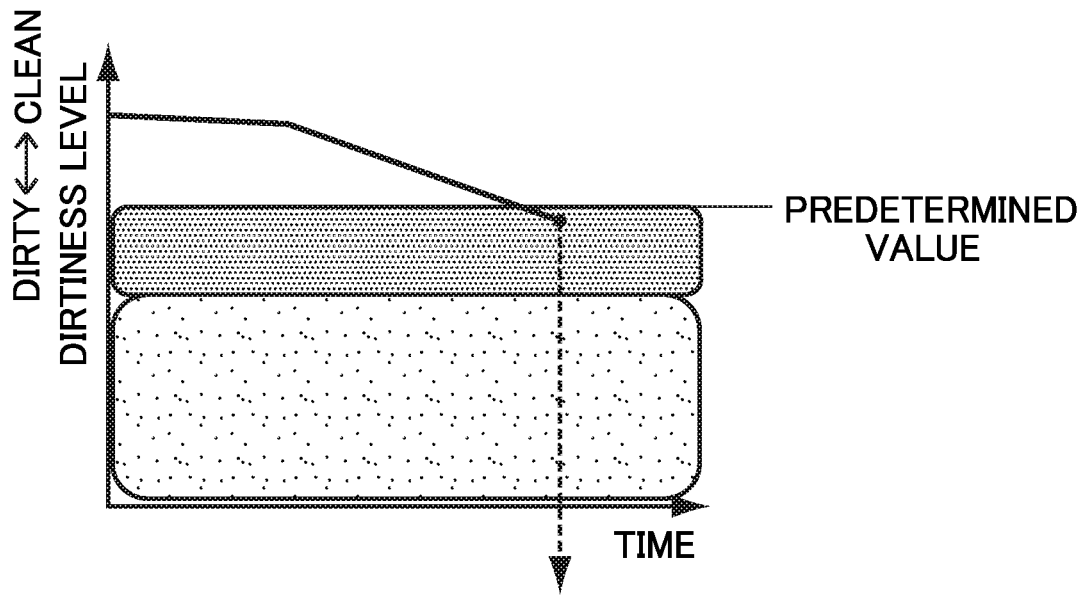
FIG. 7A is a time chart illustrating an example of change over time in the dirtiness level of a cleaning target.
Figure 7B:
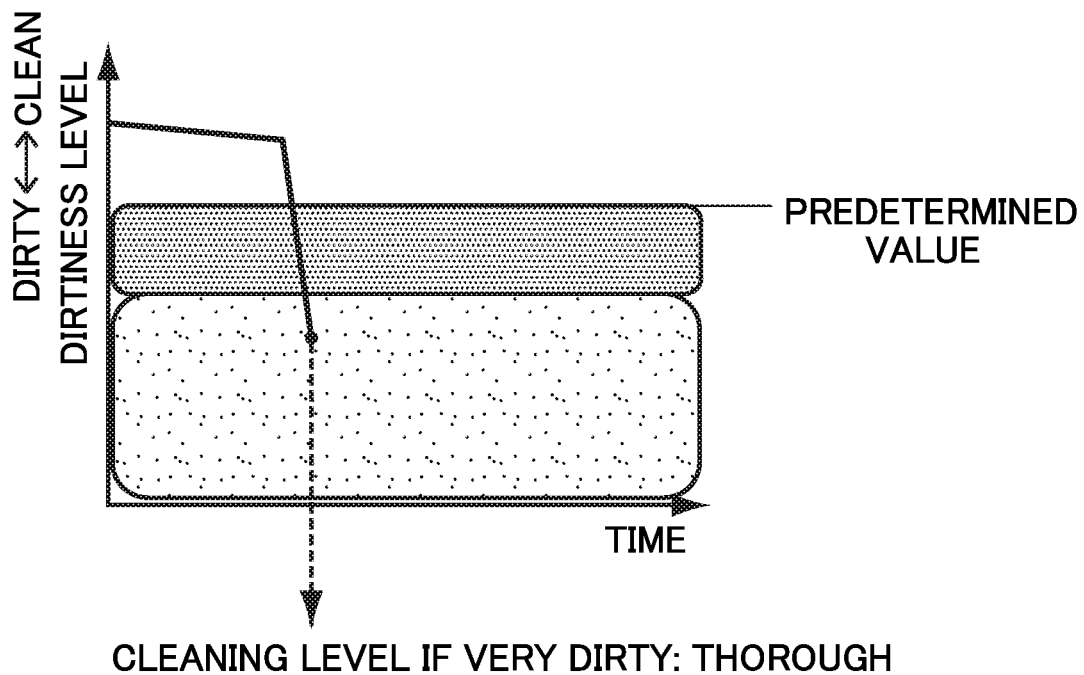
FIG. 7B is a time chart illustrating an example of change over time in the dirtiness level of a cleaning target.

As illustrated in FIG. 7A for example, in the case of a cleaning target with a dirtiness level that gradually increases, the cleaning target is not cleaned for a comparatively long period until the dirtiness level evaluation value falls below the predetermined value in the above-described cleaning processing, and even when the dirtiness level evaluation value falls below the predetermined value and cleaning is performed, the cleaning level is comparatively small. The number of cleaning cycles performed and the cleaning level are thereby suppressed. However, as illustrated in FIG. 7B for example, in the case of a cleaning target with a dirtiness level that rapidly increases, cleaning is performed as soon as the dirtiness level evaluation value falls below the predetermined value, and the cleaning level is comparatively large in response to the dirtiness level evaluation value. This suppresses a cleaning target from being left in a dirty state for a long period.

Second Exemplary Embodiment

Next, explanation follows regarding a second exemplary embodiment of the present invention. Note that sections similar to those in the first exemplary embodiment are allocated the same reference numerals, and explanation thereof is omitted.

As illustrated in FIG. 8, the front cleaning system 2 according to the second exemplary embodiment includes an air nozzle 26b provided in the vicinity of the sensor face of the LIDAR 26 to blow air toward the sensor face of the LIDAR 26, an air nozzle 27b provided in the vicinity of the front grille camera 27 to blow air toward the sensor face of the front grille camera 27, and air nozzles (not illustrated in the drawings) respectively provided in the vicinity of the sensor faces of the side LIDARs 38 to blow air toward the sensor faces of the side LIDARs 38. The air nozzle 26b, the air nozzle 27b, and air nozzles to blow air toward the sensor faces of the side LIDARs 38 are also examples of cleaning sections.

The rear cleaning system 3 according to the second exemplary embodiment includes an air nozzle 52b provided in the vicinity of the sensor face of the LIDAR 52 to blow air toward the sensor face of the LIDAR 52, an air nozzle 53b provided in the vicinity of the rear camera 53 to blow air toward the sensor face of the rear camera 53, and air nozzles (not illustrated in the drawings) respectively provided in the vicinity of the sensor faces of the side LIDARs 56 to blow air toward the sensor faces of the side LIDARs 56. The air nozzle 52b, the air nozzle 53b and the air nozzles to blow air toward the sensor faces of the side LIDARs 56 are also examples of cleaning sections.

Next, explanation follows regarding an air supply system. In the front cleaning system 2, the air nozzle 26b, the air nozzle 27b and the air nozzles that blow air toward the sensor faces of the side LIDARs 38 are each connected to an air pump 41 through an air hose. Pressurized air is supplied to the respective air nozzles 26b, 27b, and so on through these air hoses by the air pump 41.

In the rear cleaning system 3, the air nozzle 52b, the air nozzle 53b, and the air nozzles for cleaning the sensor faces of the side LIDARs 56 are each connected to an air pump 49 through an air hose. Pressurized air is supplied to the respective air nozzles 52b, 53b, and so on through these air hoses by the air pump 49.

As illustrated in FIG. 9, the cleaning control ECU 22 is connected to a motor 32 that drives the air pump 41 via an air pump drive section 33. An operation duration for the motor 32 is instructed by the cleaning control ECU 22, and the air pump drive section 33 drives the motor 32 for the instructed operation duration. The cleaning control ECU 22 is also connected to a motor 54 that drives the air pump 49 via an air pump drive section 57. An operation duration for the motor 54 is instructed by the cleaning control ECU 22, and the air pump drive section 57 drives the motor 54 for the instructed operation duration. The cleaning control ECU 22 is also connected to the respective air nozzles 26b, 27b, and so on corresponding to the front cleaning system 2 and to the respective air nozzles 52b, 53b, and so on corresponding to the rear cleaning system 3 through individually controllable signal lines or power source lines.

Figure 10:
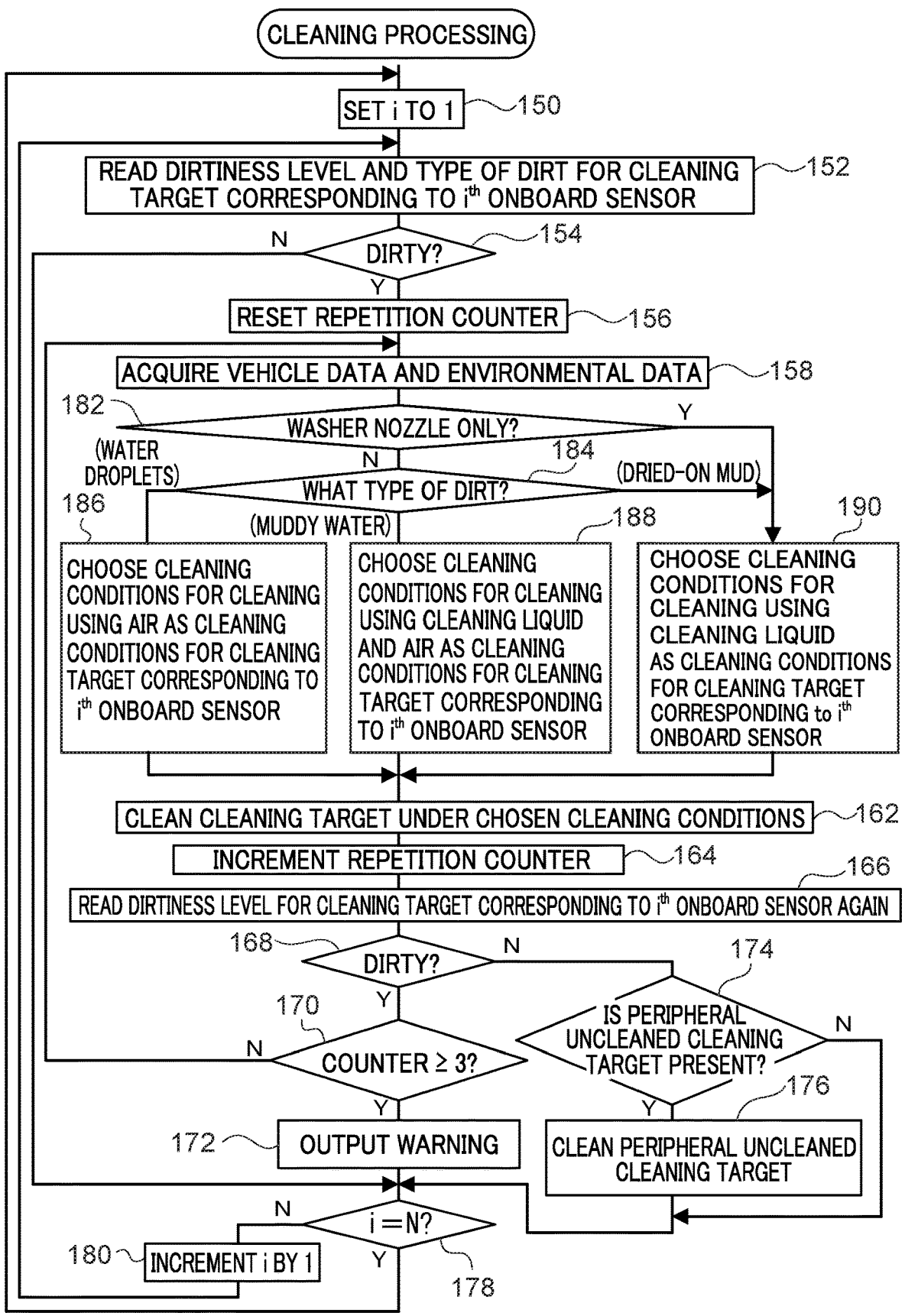
FIG. 10 is a flowchart illustrating an example of cleaning processing according to the second exemplary embodiment.

Next, with reference to FIG. 10, explanation follows regarding elements of cleaning processing according to the second exemplary embodiment that differ from the cleaning processing described in the first exemplary embodiment. In the cleaning processing according to the second exemplary embodiment, the vehicle data and the environmental data are acquired at step 158, after which processing transitions to step 182. At step 182, the cleaning control ECU 22 determines whether or not only a washer nozzle is provided (i.e. whether an air nozzle is not provided) to the cleaning target corresponding to the $i^{th}$ onboard sensor. In the present exemplary embodiment, an affirmative determination is made at step 182 in cases in which the cleaning target corresponding to the front camera 21 configuring the $i^{th}$ onboard sensor is the front windshield 20, and in cases in which the cleaning target corresponding to the rear camera 46 configuring the $i^{th}$ onboard sensor is the rear windshield 45.

Processing transitions to step 190 in cases in which affirmative determination is made at step 182. At step 190, the cleaning control ECU 22 chooses cleaning conditions for cleaning by spraying cleaning liquid through the washer nozzle as cleaning conditions for the cleaning target corresponding to the $i^{th}$ onboard sensor, based on the dirtiness level and the type of dirt acquired at step 152. Note that the specifics of choosing the cleaning conditions at step 190 are the same as at step 160 explained in the first exemplary embodiment. Processing transitions to step 184 in cases in which negative determination is made at step 182. At step 184, the processing performed by the cleaning control ECU 22 branches according to the type of dirt on the cleaning target corresponding to the $i^{th}$ onboard sensor as read at step 152.

The processing branches from step 184 to step 186 in cases in which the type of dirt on the cleaning target corresponding to the $i^{th}$ onboard sensor is water droplets. At step 186, the cleaning control ECU 22 chooses cleaning conditions for cleaning by blowing air through the corresponding air nozzle as cleaning conditions for the cleaning target corresponding to the $i^{th}$ onboard sensor, based on the vehicle data and the environmental data acquired at step 158, and the dirtiness level and the type of dirt acquired at step 152. As illustrated in FIG. 11 as an example, in the cleaning condition table 23b according to the second exemplary embodiment, "number of air blowing cycles" has been added as a cleaning parameter. The numbers of air blowing cycles corresponding to the various input parameter values for the vehicle data, environmental data, dirtiness level, type of dirt, and the counter value of the repetition counter are read from the cleaning condition table 23b, and a maximum value out of the read number of air blowing cycles is chosen as the cleaning condition.

The processing branches from step 184 to step 188 in cases in which the type of dirt on the cleaning target corresponding to the $i^{th}$ onboard sensor is muddy water. At step 188, the cleaning control ECU 22 chooses cleaning conditions for cleaning by blowing air through the corresponding air nozzle and by spraying cleaning liquid through the corresponding washer nozzle as cleaning conditions for the cleaning target corresponding to the $i^{th}$ onboard sensor, based on the vehicle data and the environmental data acquired at step 158, and the dirtiness level and the type of dirt acquired at step 152. The processing branches from step 184 to step 190 in cases in which the type of dirt on the cleaning target corresponding to the $i^{th}$ onboard sensor is Dried-on mud, and cleaning conditions for cleaning by spraying cleaning liquid through the corresponding washer nozzle are chosen as described previously.

Processing transitions to step 162 once the cleaning conditions have been chosen at step 186, step 188, or step 190 in the above manner, and the cleaning target corresponding to the $i^{th}$ onboard sensor is cleaned according to the chosen cleaning conditions. Note that when cleaning is performed by both blowing air through an air nozzle and spraying cleaning liquid through a washer nozzle, either the blowing of air through the air nozzle or the spraying of cleaning liquid through the washer nozzle may be performed first. Alternatively, for example, the cleaning target may be sprayed with cleaning liquid for a short time on a first occasion, sprayed with cleaning liquid for a long time on a second occasion, blown with air through the air nozzle for a short time on a third occasion, and blown with air through the air nozzle for a long time on a fourth occasion.

In this manner, in the above exemplary embodiment the cleaning conditions are chosen based on the vehicle data, the environmental data, the dirtiness level, and the type of dirt, and the cleaning target is cleaned by the corresponding washer nozzle and/or air nozzle according to the chosen cleaning conditions, thereby enabling the cleaning target to be automatically cleaned in an appropriate manner according to the dirtiness level of the cleaning target. Moreover, in situations in which the dirtiness level of the cleaning target is low, excessive cleaning using the washer nozzle or the air nozzle can be suppressed compared to cases in which cleaning by the cleaning section is performed under uniform cleaning conditions.

Moreover, in the above exemplary embodiment, the cleaning condition table 23b that holds cleaning conditions for given values for the vehicle data, the environmental data, the dirtiness level, and the type of dirt, is stored in the storage section 22c. The cleaning conditions are chosen using the cleaning condition table 23b. This enables processing to choose the cleaning conditions to be simplified compared to cases in which the cleaning conditions are determined using conditional branching.

Moreover, in the above exemplary embodiments, in cases in which the cleaning target is still dirty even after the cleaning of the cleaning target using the washer nozzle or the air nozzle has been performed a predetermined number of times, a warning is output to notify the occupant. The occupant can thereby be informed that removal of the dirt from the cleaning target is considered to be difficult to achieve by cleaning using the washer nozzle or the air nozzle. This enables excessive cleaning using the washer nozzle or the air nozzle to be suppressed.

Moreover, in the above exemplary embodiments, the type of dirt on a cleaning target corresponding to a camera located in the vicinity is acquired as the type of dirt on a cleaning target corresponding to a LIDAR, and the cleaning conditions are chosen based on the acquired type of dirt. This enables precision cleaning of the corresponding cleaning target, even in the case of a LIDAR for which it is currently difficult to determine the type of dirt on the corresponding cleaning target.

Note that although configurations have been described above in which the cleaning conditions are chosen according to the vehicle data, the environmental data, the dirtiness level, and the type of dirt, there is no limitation thereto. The cleaning conditions may be chosen according to any one out of the vehicle data, the environmental data, the dirtiness level, or the type of dirt. Alternatively, the cleaning conditions may be chosen according to a combination of some parameters out of the vehicle data, the environmental data, the dirtiness level, or the type of dirt.

Note that although configurations have been described above in which the operation voltage, the operation duration, and the number of operation cycles are varied as cleaning conditions for cleaning by a washer nozzle, there is no limitation thereto. Any one or two parameter values out of the operation voltage, the operation duration, or the number of operation cycles may be fixed, with the remaining parameter values being varied.

Note that although the speed of the vehicle 6 and the distance traveled by the vehicle 6 since the previous clean have been given as examples of vehicle data employed when choosing the cleaning conditions, there is no limitation thereto. For example, the cleaning conditions may be chosen according to at least one type of vehicle data out of the distance traveled by the vehicle 6 since the ignition switch of the vehicle 6 was switched on, the time elapsed since the ignition switch of the vehicle 6 was switched on, the vehicle travel route, or the like.

Note that although the temperature and the weather in the surroundings of the vehicle 6 have been given as examples of environmental data employed when choosing the cleaning conditions, there is no limitation thereto. For example, the cleaning conditions may be chosen according to environmental data such as the road surface condition. The road surface condition can be detected based on the temperature, the weather, and images captured by an onboard camera, and can also be detected based on vehicle vibration waveforms or travel noise waveforms.

Although the dirtiness level evaluation value, the type of dirt, and the position of an area with a high dirtiness level have been given as examples of "an indicator relating to adhesion of adhered material to the cleaning target" employed in choosing the cleaning conditions, there is no limitation thereto. For example, if the onboard sensor is a camera, the indicator relating to adhered material employed in choosing the cleaning conditions may for example be an indicator relating to the size, color, or edge strength of an image region corresponding to the adhered material.

In the explanation regarding the first exemplary embodiment and the second exemplary embodiment, the following trigger is applied:

Trigger (1): Dirtiness level evaluation value of cleaning target falls below predetermined value Cleaning is triggered when the dirtiness level evaluation value of a cleaning target falls below the predetermined value.

However, there is no limitation to trigger (1) as a trigger for cleaning a cleaning target, and for example cleaning of some or all of the cleaning targets may be triggered by at least one trigger out of trigger (2) to trigger (6).

Trigger (2): Ignition switch is switched from off to on
Trigger (3): Ignition switch is switched from on to off
Trigger (4): Rainfall is detected
Trigger (5): Travel at a predetermined speed or greater has continued for a predetermined duration or greater
Trigger (6): The vehicle has entered an emergency state In cases in which cleaning of cleaning targets is triggered by trigger (2), the vehicle 6 can be prevented from traveling while still in a state in which adhered material such as dirt has adhered to a cleaning target while the vehicle is parked or stationary. Moreover, an initial check of onboard sensors such as cameras is sometimes performed when the ignition switch is switched on. In such cases, a state can be achieved in which adhered material on the sensor faces and so on is removed in advance, thereby enabling a drop in the detection capability of the onboard sensors during the initial check due to dirt or the like having adhered thereto to be suppressed.

In cases in which cleaning of cleaning targets is triggered by trigger (2), for example, the cleaning conditions can be chosen according to the length of time for which the ignition switch was off, or according to the length of time since cleaning was last performed. As an example, cleaning of the cleaning targets may be omitted in cases in which the length of time is less than 30 minutes, the cleaning targets may be cleaned under cleaning conditions equivalent to a light cleaning level in cases in which the length of time is 30 minutes or greater but less than 3 hours, the cleaning targets may be cleaned under cleaning conditions equivalent to a medium cleaning level in cases in which the length of time is 3 hours or greater but less than 3 days, and the cleaning targets may be cleaned under cleaning conditions equivalent to a thorough cleaning level in cases in which the length of time is 3 days or greater. This enables the cleaning targets to be sufficiently cleaned as required, and also enables unnecessary consumption of cleaning liquid and the like to be prevented. Note that the length of time for which the ignition switch was off and the length of time since cleaning was last performed are examples of travel situations of the vehicle.

In cases in which cleaning of cleaning targets is triggered by trigger (3), the adhesion level of adhered material to the cleaning target when the vehicle 6 is next boarded can be suppressed. Moreover, a state in which adhered material has adhered to cleaning targets can be prevented from persisting for an extended period. In cases in which cleaning of cleaning targets is triggered by trigger (3), for example, the cleaning conditions can be chosen according to the length of time since cleaning was last performed.

Note that the vehicle 6 is stationary when the cleaning of cleaning targets is triggered by trigger (2) or trigger (3), and so a person may be present in the surroundings of the vehicle 6. In cases in which a person is present in the surroundings of the vehicle 6, this person may be splashed by cleaning liquid when a cleaning target is cleaned by spraying cleaning liquid. Thus, in cases in which the cleaning of cleaning targets is triggered by trigger (2) or trigger (3), determination may be made as to whether or not a person is present in the surroundings of the vehicle 6 based on an image captured by a camera. In cases in which a person is present in the surroundings of the vehicle 6, cleaning using cleaning liquid may be stopped but cleaning using air performed, or cleaning using cleaning liquid may be delayed until the person has left the surroundings of the vehicle 6.

Adhered material is liable to adhere to cleaning targets when mud or the like is flicked up during wet weather. In cases in which cleaning of cleaning targets, such as blowing air through an air nozzle, is triggered by trigger (4), water droplets on the cleaning target are blown off by the air blown through the air nozzle, enabling adhered material that has adhered to the cleaning target to be removed together with the water droplets. Note that cleaning during wet weather is not limited to blowing air through the air nozzles, and cleaning may be also performed by spraying cleaning liquid through the washer nozzles.

The need for cleaning during wet weather varies according to the amount of rain, and for example the greater the amount of rain, the greater the likelihood of adhered material adhering to the cleaning targets due to mud being flicked up or the like. Thus, in cases in which the cleaning of cleaning targets is triggered by trigger (2), for example the cleaning conditions can be chosen according to the amount of rain as detected by a rainfall sensor or the like. For example, the cleaning targets may be cleaned under cleaning conditions equivalent to a light cleaning level when the amount of rain is less than a first predetermined value, the cleaning targets may be cleaned under cleaning conditions equivalent to a medium cleaning level in cases in which the amount of rain is the first predetermined value or greater but less than a second predetermined value (note first predetermined value<second predetermined value), and the cleaning targets may be cleaned under cleaning conditions equivalent to a thorough cleaning level in cases in which the amount of rain is the second predetermined value or greater. For example, in cases in which an air nozzle is provided to a cleaning target, an example of a cleaning condition equivalent to a light cleaning level is a cleaning condition in which air is blown through the air nozzle at time intervals of 30 seconds, an example of a cleaning condition equivalent to a medium cleaning level is a cleaning condition in which air is blown through the air nozzle at time intervals of 15 seconds, and an example of a cleaning condition equivalent to a thorough cleaning level is a cleaning condition in which air is blown through the air nozzle at time intervals of 5 seconds. The amount of rain is an example of an environmental situation.

Moreover, in cases in which the vehicle 6 has been traveling at a predetermined speed or greater for a predetermined duration or greater, the likelihood of adhered material such as dirt adhering to the cleaning targets increases. In cases in which cleaning of cleaning targets is triggered by trigger (5), dirt or the like that has adhered to the cleaning targets while the vehicle 6 is traveling can be removed. In cases in which cleaning of cleaning targets is triggered by trigger (5), cleaning conditions may for example be chosen according to at least one out of the speed, travel duration, distance traveled, or travel route of the vehicle 6.

In an example in which the cleaning conditions are chosen according to the speed of the vehicle 6, the cleaning targets are for example cleaned in cases in which the vehicle 6 has traveled at 5 km/h or faster for 3 minutes or longer. The cleaning targets may be cleaned under cleaning conditions equivalent to a light cleaning level in cases in which the vehicle speed is less than 20 km/h, the cleaning targets may be cleaned under cleaning conditions equivalent to a medium cleaning level in cases in which the vehicle speed is 20 km/h or faster but less than 80 km/m, and the cleaning targets may be cleaned under cleaning conditions equivalent to a thorough cleaning level in cases in which the vehicle speed is 80 km/h or faster. For example, in cases in which a washer nozzle and an air nozzle are provided to a cleaning target, an example of cleaning conditions equivalent to a light cleaning level are cleaning conditions in which air is blown through the air nozzle at intervals of 180 seconds and cleaning liquid is sprayed through the washer nozzle at intervals of 1800 seconds, an example of cleaning conditions equivalent to a medium cleaning level are cleaning conditions in which air is blown through the air nozzle at intervals of 60 seconds and cleaning liquid is sprayed through the washer nozzle at intervals of 600 seconds, and an example of cleaning conditions equivalent to a thorough cleaning level are cleaning conditions in which air is blown through the air nozzle at intervals of 20 seconds and cleaning liquid is sprayed through the washer nozzle at intervals of 200 seconds. In cases in which cleaning is performed by blowing air in addition to spraying cleaning liquid as in the above example, the frequency with which cleaning targets are cleaned can be increased such that sufficient cleaning can be performed, and excessive consumption of cleaning liquid can be prevented.

The dirtiness level of the cleaning targets may differ according to the travel route of the vehicle 6. Note that data relating to traffic conditions, such as congestion data, is also included in the travel route. The travel route of the vehicle 6 is ascertained by the ADAS-ECU 10, and may thus be acquired from the ADAS-ECU 10. In the example in which the cleaning conditions are chosen according to the travel route of the vehicle 6, the cleaning targets may be cleaned under cleaning conditions equivalent to a light cleaning level in cases in which the vehicle 6 is traveling along a general road where congestion has occurred, the cleaning targets may be cleaned under cleaning conditions equivalent to a medium cleaning level in cases in which the vehicle 6 is traveling along a general road where congestion has not occurred or an expressway where congestion has occurred, and the cleaning targets may be cleaned under cleaning conditions equivalent to a thorough cleaning level in cases in which the vehicle 6 is traveling along an expressway where congestion has not occurred. In such cases, the cleaning of cleaning targets can be performed under cleaning conditions suited to the travel route of the vehicle 6.

In cases in which the ADAS-ECU 10 has detected that the vehicle 6 has entered an emergency state, for example when functionality of a section of the vehicle 6 becomes compromised, a high reliability is demanded of detection by the individual onboard sensors. In cases in which cleaning of cleaning targets is triggered by trigger (6), any reduction in the detection capability of the onboard sensors is suppressed, enabling the ADAS-ECU 10 to perform appropriate emergency control. In cases in which cleaning of cleaning targets is triggered by trigger (6), the cleaning conditions may for example be chosen according to a level of the emergency state that occurs.

Furthermore, the cleaning sequence of the respective cleaning targets may for example be varied according to the travel situation and the environmental situation. As an example, cleaning of the cleaning target corresponding to the LIDAR 26 provided at the central portion in front of the front grille 25, this being a sensor employed for collision avoidance operations, may be prioritized when traveling forward along a general road.

Although washer nozzles that spray cleaning liquid and air nozzles that blow air have been given as examples of cleaning sections in the above description, there is no limitation thereto. For example, a configuration in which a cleaning target is subjected to ultrasonic vibration in order to remove water droplets may be applied.

Although explanation has been given in which cleaning by the front cleaning system 2 and cleaning by the rear cleaning system 3 are both controlled by the cleaning control ECU 22 in the above description, there is no limitation thereto. As illustrated in FIG. 12 for example, instead of the cleaning control ECU 22, a wiper ECU 60*a* that controls cleaning by the front cleaning system 2 may be provided to the front cleaning system 2, and a wiper ECU 60*b* that controls cleaning by the rear cleaning system 3 may be provided to the rear cleaning system 3. In such cases, processing such as the dirt detection processing may be performed by the respective wiper ECUs 60*a*, 60*b*, or may be performed by the ADAS-ECU 10.

Note that the placement of the respective onboard sensors in the vehicle 6 is not limited to the positions illustrated in FIG. 1 and so on. For example, ultrasound sensors may be provided at the front, rear, or sides of the vehicle 6. Ultrasound sensors detect objects such as other vehicles present in the surroundings, and are employed to detect other vehicles entering a traffic lane during travel, and for obstacle detection in parking assist systems. Since ultrasound sensors employ sound waves, as long as the sound waves can be transmitted, obstacle detection is possible even if, for example, dirt has adhered to the sensor face. The cleaning requirements of the sensor faces of ultrasound sensors are therefore low. However, cleaning sections such as washer nozzles or air nozzles may be provided thereto as required.

Note that although configurations have been described in which the present invention is applied to the vehicle 6 installed with the ADAS-ECU 10 that performs autonomous driving processing corresponding to level 3 to level 5, there is no limitation thereto. For example, the present invention may be applied to a vehicle installed with a driving assistance system (the driving assistance system being an example of a driving assistance device) to perform driving assistance processing corresponding to level 1 or level 2. Even if an autonomous driving system or a driving assistance system is not installed, the present invention may still be applied to a vehicle that includes cleaning targets such as onboard sensors.

Although configurations provided with the multi-valves 16, 17 have been described above, there is no limitation thereto. For example, plural individual valves may be respectively provided to the front washer pump 14 and the rear washer pump 15 instead of these multi-valves, and the cleaning control ECU 22 may control these plural individual valves so as to supply cleaning liquid to predetermined washer nozzles.

Note that although a configuration has been described in which the air pump 41 is provided to the front cleaning system 2 and the air pump 49 is provided to the rear cleaning system 3 in the second exemplary embodiment, there is no limitation thereto. For example, a single air pump may be provided, or air pumps may be provided corresponding to the individual air nozzles.

The entire content of the disclosure of Japanese Patent Application No. 2017-237730 filed on Dec. 12, 2017 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle cleaning system comprising:
a fluid supply nozzle configured to clean a cleaning target including an onboard sensor provided to a vehicle; and
a hardware processor configured (i) to choose a cleaning level to be performed by the fluid supply nozzle based on a travel situation of the vehicle, an environmental situation of the vehicle, an indicator relating to adhesion of adhered material to the cleaning target, and a degree of change in the indicator due to past cleaning of the cleaning target by the fluid supply nozzle, and (ii) to cause the fluid supply nozzle to clean the cleaning target under the chosen cleaning level, wherein
when the hardware processor determines to clean the cleaning target a second time after a first time cleaning of the cleaning target did not result in a dirtiness level of the cleaning target reaching a predetermined value, the hardware processor chooses a value of the cleaning level for the second time cleaning by the fluid supply nozzle, the value of the cleaning level being chosen from a plurality of discrete values that are set from low to high depending on the degree of change in the indicator due to the past cleaning, which was the first time cleaning, of the cleaning target by the fluid supply nozzle,
the first time cleaning of the cleaning target is performed when an ignition switch of the vehicle is switched from off to on,
a cleaning level of the first time cleaning is set to one of a plurality of settable levels based on a length of time that the ignition switch was off before being switched from off to on, and
as the degree of change in the indicator due to the past cleaning of the cleaning target by the fluid supply nozzle changes, the value of the cleaning level that is chosen for the second time cleaning by the fluid supply nozzle changes so that (1) when the degree of change in the indicator due to the past cleaning is low, the value of the cleaning level for the second time cleaning by the fluid supply nozzle is high and (2) when the degree of change in the indicator due to the past cleaning is high, the value of the cleaning level for the second time cleaning by the fluid supply nozzle is low.

2. The vehicle cleaning system of claim 1, wherein:
the cleaning level includes at least one of an operation intensity, an operation duration, and a number of operation cycles of the fluid supply nozzle; and
the hardware processor controls the at least one of the operation intensity, the operation duration, and the number of operation cycles of the fluid supply nozzle based on the chosen cleaning level during the cleaning of the cleaning target.

3. The vehicle cleaning system of claim 1, further comprising:
a memory configured to store different values of the cleaning level to be performed by the fluid supply nozzle in association with different values of the travel situation of the vehicle, the environmental situation of the vehicle, the indicator relating to adhesion of adhered material to the cleaning target, and the degree of change of the indicator due to past cleaning of the cleaning target by the fluid supply nozzle, wherein
the hardware processor is configured to choose one of the different values of the cleaning level corresponding to the travel situation of the vehicle, the environmental situation of the vehicle, the indicator relating to adhesion of adhered material to the cleaning target, and the degree of change of the indicator due to past cleaning of the cleaning target by the fluid supply nozzle based on data stored in the memory.

4. The vehicle cleaning system of claim 1, wherein:
the hardware processor is configured to output a warning when the indicator relating to adhesion of adhered material to the cleaning target has a value indicating that the adhered material is present even though cleaning of the cleaning target by the fluid supply nozzle has been performed a predetermined number of times.

5. The vehicle cleaning system of claim 1, wherein:
the cleaning target includes a plurality of the cleaning targets provided to the vehicle;
a plurality of the fluid supply nozzles are provided corresponding to the plurality of the cleaning targets; and
the hardware processor is configured to control each of the plurality of fluid supply nozzles independently of each other.

6. The vehicle cleaning system of claim 5, wherein the plurality of the cleaning targets includes a first cleaning target and a second cleaning target, and wherein the hardware processor is further configured to:
acquire an indicator relating to adhesion of the adhered material to the first cleaning target;
choose the cleaning level based on the indicator relating to adhesion of the adhered material to the first cleaning target as an indicator relating to adhesion of the adhered material to the second cleaning target; and
control the fluid supply nozzle for the second cleaning target so as to clean the second cleaning target based on the chosen cleaning level.

7. The vehicle cleaning system of claim 1, wherein the travel situation of the vehicle includes at least one of a speed of the vehicle, a travel route of the vehicle, a distance traveled by the vehicle, and a time elapsed since a predetermined processing.

8. The vehicle cleaning system of claim 1, wherein the environmental situation of the vehicle includes at least one of temperature and weather.

9. The vehicle cleaning system of claim 1, wherein the indicator relating to adhesion of adhered material to the cleaning target of the vehicle includes at least one of an adhesion level of the adhered material to the cleaning target, an adhered material type, and an adhesion location of the adhered material.

10. The vehicle cleaning system of claim 1, wherein the fluid supply nozzle is configured to clean by spraying liquid or blowing air onto the cleaning target.

11. The vehicle cleaning system of claim 1, wherein:
the cleaning target provided to the vehicle includes a sensor employed by a driving assistance device or an autonomous driving device that is installed in the vehicle.

* * * * *